United States Patent
Yamamura et al.

(10) Patent No.: US 11,285,553 B2
(45) Date of Patent: Mar. 29, 2022

(54) MITER SAW

(71) Applicant: MAKITA CORPORATION, Anjo (JP)

(72) Inventors: Goh Yamamura, Anjo (JP); Yuki Miwa, Anjo (JP)

(73) Assignee: MAKITA CORPORATION, Anjo (JP)

(*) Notice: Subject to any disclaimer, the term of this patent is extended or adjusted under 35 U.S.C. 154(b) by 25 days.

(21) Appl. No.: 16/936,555

(22) Filed: Jul. 23, 2020

(65) Prior Publication Data

US 2021/0039177 A1 Feb. 11, 2021

(30) Foreign Application Priority Data

Aug. 6, 2019 (JP) .............................. JP2019-144823

(51) Int. Cl.
| | |
|---|---|
| B23D 45/04 | (2006.01) |
| B27B 5/29 | (2006.01) |
| B23D 47/02 | (2006.01) |

(52) U.S. Cl.
CPC ......... B23D 45/044 (2013.01); B23D 45/048 (2013.01); B27B 5/29 (2013.01); B23D 47/025 (2013.01)

(58) Field of Classification Search
CPC .... B23D 45/044; B23D 45/04; B23D 45/024; B23D 45/048; B23D 47/025; B23D 47/02; B27B 5/29
USPC ...................... 83/471.3, 477, 477.1, 473, 435
See application file for complete search history.

(56) References Cited

U.S. PATENT DOCUMENTS

| | | | |
|---|---|---|---|
| 5,870,939 A | 2/1999 | Matsubara | |
| 7,854,187 B2* | 12/2010 | Liu | B23D 47/04 83/471.3 |
| 9,662,724 B1* | 5/2017 | Knight | B27B 5/29 |
| 9,833,849 B2* | 12/2017 | Knight | B23D 47/025 |
| 10,099,301 B2* | 10/2018 | Chiang | B27B 5/29 |
| 10,322,459 B1* | 6/2019 | Chang | B23D 45/044 |
| 2006/0011036 A1 | 1/2006 | Ushiwata et al. | |
| 2009/0107316 A1* | 4/2009 | Thomas | B23D 45/048 83/471.3 |
| 2011/0209593 A1 | 9/2011 | Kani et al. | |
| 2013/0160628 A1* | 6/2013 | Chiu | B27B 5/29 83/471.3 |

(Continued)

FOREIGN PATENT DOCUMENTS

| | | |
|---|---|---|
| JP | H09136215 A | 5/1997 |
| JP | H09207023 A | 8/1997 |
| JP | H09277118 A | 10/1997 |

(Continued)

*Primary Examiner* — Nhat Chieu Q Do
(74) *Attorney, Agent, or Firm* — J-Tek Law PLLC; Jeffrey D. Tekanic; Scott T. Wakeman

(57) ABSTRACT

A benchtop cutting machine (1), such as a miter saw, includes: a base (2); a turntable (3), which is rotatable relative to the base; and a lock mechanism (40), which locks the rotation of the turntable relative to the base. The lock mechanism comprises a locking pin (45), which is movable along its axial direction and locks the rotation of the turntable by engaging with the base, and a manipulatable lever (41), which is pivotable in an up-down direction to release the engagement of the locking pin from the base. The manipulatable lever has a pivot point or center of rotation (42) that is located upward of the locking pin.

20 Claims, 23 Drawing Sheets

(56) References Cited

U.S. PATENT DOCUMENTS

2018/0133817 A1    5/2018    Yamamura

FOREIGN PATENT DOCUMENTS

| JP | 2002200602 A | 7/2002 |
| JP | 2006044220 A | 2/2006 |
| JP | 2007083610 A | 4/2007 |
| JP | 2009066718 A | 4/2009 |
| JP | 2010058229 A | 3/2010 |
| JP | 2018075692 A | 5/2018 |

* cited by examiner

MITER SAW

CROSS-REFERENCE

The present application claims priority to Japanese patent application serial number 2019-144823 filed on Aug. 6, 2019, the contents of which are hereby fully incorporated by reference.

TECHNICAL FIELD

The present invention relates to benchtop cutting machines, including without limitation miter saws, such as compound miter saws, dual-bevel compound miter saws, sliding compound miter saws, and dual-bevel slide compound miter saws.

BACKGROUND ART

Some types of benchtop cutting machines, such as miter saws, comprise a turntable, which is capable of rotating in a horizontal plane relative to a base. A cutting-machine main body is supported by the turntable (turn base) and rotates together with the turntable. A workpiece, which is placed on the top-plate surface (table) that spans the upper surfaces of the base and the turntable, is positioned relative to the base and cut using a cutting tool (e.g., a circular miter saw blade), which is mounted on the cutting-machine main body. When a user holds a manually manipulatable knob (operation knob), which is mounted on a near side of the turntable, and rotates the turntable, the cutting tool can be oriented at a desired miter angle relative to the workpiece. Such miter saws often have a first lock mechanism, which is used to fix the turntable at any arbitrary miter angle (within a prescribed angular range) relative to the base, and a second lock mechanism, which is used to fix the turntable at a specific miter angle selected from a plurality of prescribed miter angles that are set by the manufacturer. For example, the cutting device described in Japanese Laid-open Patent Publication 2018-075692 and its family member US 2018/0133817 includes a turntable that can be fixed at a prescribed miter angle by engaging a lock pin (locking pin) with one of a plurality of lock recesses defined in a lock plate (engagement plate) attached to the base. By pivoting an operation member (release lever), the lock pin is disengaged from the recess so that the turntable can be again rotated (turned) relative to the base. Cutting machines of this type may also further comprise a mechanism for holding the lock pin of the second lock mechanism at the released position. For example, in the known cutting device described above, an operation knob (release-holding lever), which can directly contact the operation member (release lever), is provided, and the holding of the fixing and releasing is achieved by stopping the return of the operation member (release lever) using the operation knob (release-holding lever).

SUMMARY OF THE INVENTION

In the above-described known cutting machine, the pivot center (center of rotation) of the operation member (release lever) of the second lock mechanism is disposed downward of the lock pin; in addition, a manipulatable portion (manually movable portion) of the operation member (release lever) for the lock pin is disposed upward of the operation member (manipulatable knob or grip) for a screw shaft so that the lock pin can be pivoted by an amount that is sufficient to disengage (withdraw) the lock pin from the recesses in the lock (engagement) plate of the base. However, to ensure sufficient space upward of the manipulatable knob for manipulating the operation member (release lever) for the lock pin, the size of the lock mechanism has to increase in the up-down direction. Moreover, because the workpiece is placed on the table defined by the upper surfaces of the turntable and the base, the lock mechanism cannot protrude above the upper surface of the table or else it might interfere with the workpiece. In addition, it is also necessary to provide sufficient space downward of the operation member (manipulatable knob) for the screw shaft so that the user can insert his or her finger(s) underneath the manipulatable knob to rotate the turntable. However, if the height of the base is increased to provide more vertical distance between the manipulatable knob and the bottom surface of the base, then the cost of materials and weight of the cutting machine will increase in an adverse manner. Accordingly, it would be advantageous to make the lock mechanism for setting the cutting (miter) angle at one of a plurality of prescribed miter angles more compact in the vertical (up-down) direction.

In one aspect of the present teachings, a benchtop cutting machine, such as a miter saw, comprises: a base; a turntable, which is rotatable relative to the base; and a lock mechanism, which releasably locks (blocks, prevents) rotation of the turntable relative to the base. The lock mechanism comprises a locking pin, which is movable in a front-rear direction (i.e. in the axial direction of the locking pin) and locks (prevents) the rotation of the turntable relative to the base by engaging with the base, and a manipulatable lever (lock lever or lock release lever), which is pivotable in an up-down direction to release the engagement of the locking pin with the base. A center of rotation or pivot point (pivot center) of the manipulatable lever is located upward of the locking pin. In such a design, space above the locking pin is effectively utilized, whereby the lock mechanism can be made more compact in the up-down direction.

According to a first embodiment of the above-described aspect, the lock mechanism comprises a disengagement-holding member, which maintains (holds) the locking pin in a disengaged state with respect to the base. The disengagement-holding member includes a latching part and is movable between a latching position and a releasing position. When the disengagement-holding member is moved to (disposed in) the latching position, the latching part latches the locking pin, thereby blocking movement of the locking pin along its axial direction, and maintaining the locking pin in the disengaged state from the base. Thus, by engaging with the locking pin and thereby maintaining the disengaged state, the amount of manipulation required to engage and disengage the lock mechanism can be reduced, and the lock mechanism can be made more compact in the front-rear direction, i.e. in the axial direction of the locking pin.

In a second embodiment that is a further development of the above-described first embodiment, the disengagement-holding member is movable in a left-right direction to shift between the latching position and the releasing position. Because it is unnecessary to move the disengagement-holding member in the up-down (vertical direction) in this embodiment, the lock mechanism can be made more compact in the up-down direction.

In a third embodiment that is a further development of the above-described second embodiment, the benchtop cutting machine further comprises a rotational-manipulatable member that includes a manipulatable knob (e.g., a grip), which a user holds when rotating the turntable, and a support shaft, which supports the manipulatable knob. The disengagement-holding member comprises a slide shaft, which is disposed on the upper side of (above) the support shaft of the rotational-manipulatable member and extends in the left-right direction (i.e. perpendicular to the axial direction of the locking pin and perpendicular to the up-down direction). The slide shaft is supported by the turntable such that it is axially slidable (i.e. it is slidable in the direction of its axial extension). By sliding the slide shaft, the disengagement-holding member is moved between the latching position and the releasing position. Thereby, because the structure upward of the support shaft of the rotational-manipulatable member can be simplified as compared to known benchtop cutting machines (miter saws), the lock mechanism can be made more compact in the up-down direction by disposing the manipulatable knob more upwardly (i.e. closer to the level of the table surface of the benchtop cutting machine) than in known benchtop cutting machines.

In a fourth embodiment that is a further development of the above-described third embodiment, a manipulatable portion of the manipulatable lever (i.e. the portion of the manipulative lever designed to be held by the user's hand to pivot the manipulative lever) is disposed downward of the rotational-manipulatable member (i.e. downward of the manipulatable knob or grip). Thereby, because the structure upward of the support shaft of the rotational-manipulatable member is simplified, the lock mechanism can be made more compact in the up-down direction by disposing the manipulatable knob more upwardly (i.e. closer to the level of the table surface of the benchtop cutting machine) than in known benchtop cutting machines.

In a fifth embodiment that is a further development of the above-described third or fourth embodiments, a support body, which supports the support shaft of the manipulatable knob, is provided on a lower surface of the turntable. As viewed in the front-rear direction (or more precisely, in the axial direction of the locking pin), the slide shaft of the disengagement-holding member is disposed between the support body and a front end of the turntable or the manipulatable knob. Thereby, the lock mechanism can be made more compact in the front-rear direction (or more precisely, in the axial direction of the locking pin).

In a sixth embodiment that is a further development of any of the above-described third to fifth embodiments, a manipulatable button is provided integrally with the slide shaft of the disengagement-holding member. The disengagement-holding member is configured to be slid by pushing the manipulatable button. Thereby, because the disengagement-holding member can be moved directly by the manipulatable button, the structure of the disengagement-holding member can be simplified.

In a seventh embodiment that is a further development of any of the above-described first to sixth embodiments, the disengagement-holding member has a stop part that is configured such that, when the disengagement-holding member is moved to (disposed at) the latching position, the descent of the manipulatable lever is impeded or blocked by the stop part. Thereby, when the disengaged state is maintained, the manipulatable lever does not descend, rattling of the manipulatable lever is reduced or eliminated, and the user can easily tactilely sense whether the disengaged state is being maintained.

In an eighth embodiment that is a further development of any of the above-described first to seventh embodiments, the disengagement-holding member includes a U shape suspended part, which is disposed such that it surrounds the manipulatable lever. The latching part is disposed on the suspended part. In this embodiment, the structure is simplified because there is no latching part upward of the manipulatable knob. Therefore, the lock mechanism can be made more compact in the up-down direction by disposing the manipulatable knob more upwardly (i.e. closer to the level of the table surface of the benchtop cutting machine) than in known benchtop cutting machines.

In a ninth embodiment that is a further development of the above-described eighth embodiment, the support body is provided on the lower surface of the turntable and has a support hole that slidably holds the locking pin. The manipulatable lever has a circumvention hole that is designed so that the manipulatable lever circumvents (does not contact) the support body when the manipulatable lever is pivoted upward, i.e. the support body is partially disposed within the circumvention hole of the manipulatable lever so that the support body does not block upward pivoting movement of the manipulatable lever. The latching part is disposed on a standing part (vertically extending wall) that extends upward from the suspended part and passes through the circumvention hole. The standing part also faces the support hole of the support body. Thereby, because this embodiment ensures a sufficient range of pivoting movement of the manipulatable lever for withdrawing the locking pin from the recesses without interference by the support body, the lock mechanism can be made more compact in the up-down direction.

In a tenth embodiment that is a further development of any of the above-described first to ninth embodiments, the latching part of the disengagement-holding member has a latching hole, which has a large-hole portion and a small-hole portion. Furthermore, the locking pin has a small-diameter portion, a large-diameter portion, and a tapered portion therebetween. When the disengagement-holding member is moved to (disposed at) the latching position, the tapered portion fits in the small-hole portion of the disengagement-holding member, whereby the locking pin is held at a disengagement position by the latching part, and the disengagement-holding member is held at the latching position.

In an eleventh embodiment that is a further development of the above-described tenth embodiment, the locking pin is biased toward a locked position by a first spring. Furthermore, when the manipulatable lever is moved upward, the locking pin moves against the bias of the first spring to the disengagement position, and the small-diameter portion of the locking pin moves into the latching hole. In addition, when the disengagement-holding member is moved to the latching position, the pressing of the tapered portion against the small-hole portion of the latching hole by the first spring and the resulting mating (engagement) of the tapered portion with the small-hole portion is maintained.

In a twelfth embodiment that is a further development of the above-described eleventh embodiment, the disengagement-holding member is biased toward the releasing position by a second spring. When the manipulatable lever is moved upward while the disengaged state is being maintained, the mating of the tapered portion with the small-hole portion is released, and the disengagement-holding member is returned to the releasing position by the second spring.

In a thirteen embodiment that is a further development of the above-described twelfth embodiment, the base comprises an engagement plate (lock plate), which has at least one recess, e.g., that defines a prescribed miter angle. A tip portion of the locking pin has a terminal end surface and a circular-columnar-shaped side surface. One or both of a left edge and a right edge of the end surface has a sloped surface, which is chamfered to be flat. The rotation of the turntable relative to the base is locked (blocked) when the sloped surface(s) of the locking pin engage with the at least one recess of the engagement plate of the base. Thereby, in such an embodiment, even if the locking pin is formed from a round bar and basically has a circular-columnar shape, or even if the engagement plate of the base is relatively thin, force tends not to be applied from the locking pin to the engagement plate in the up-down direction, and therefore the engagement plate is less likely to be displaced or bent.

DETAILED DESCRIPTION OF THE INVENTION

Figure 1:
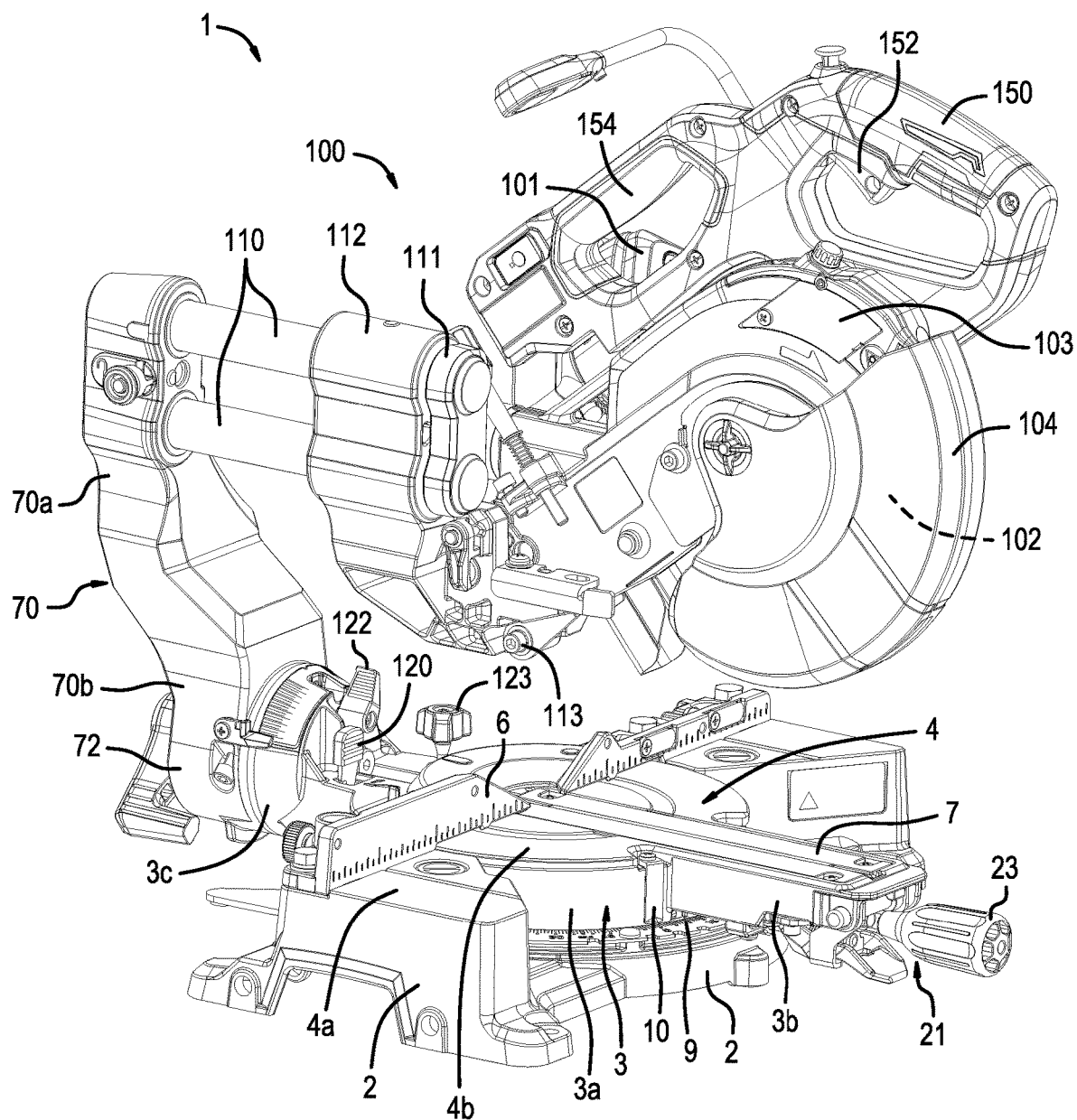
FIG. 1 is an oblique view of a benchtop cutting machine according to one exemplary embodiment of the present teachings as viewed from the diagonal left-front side.
Figure 2:
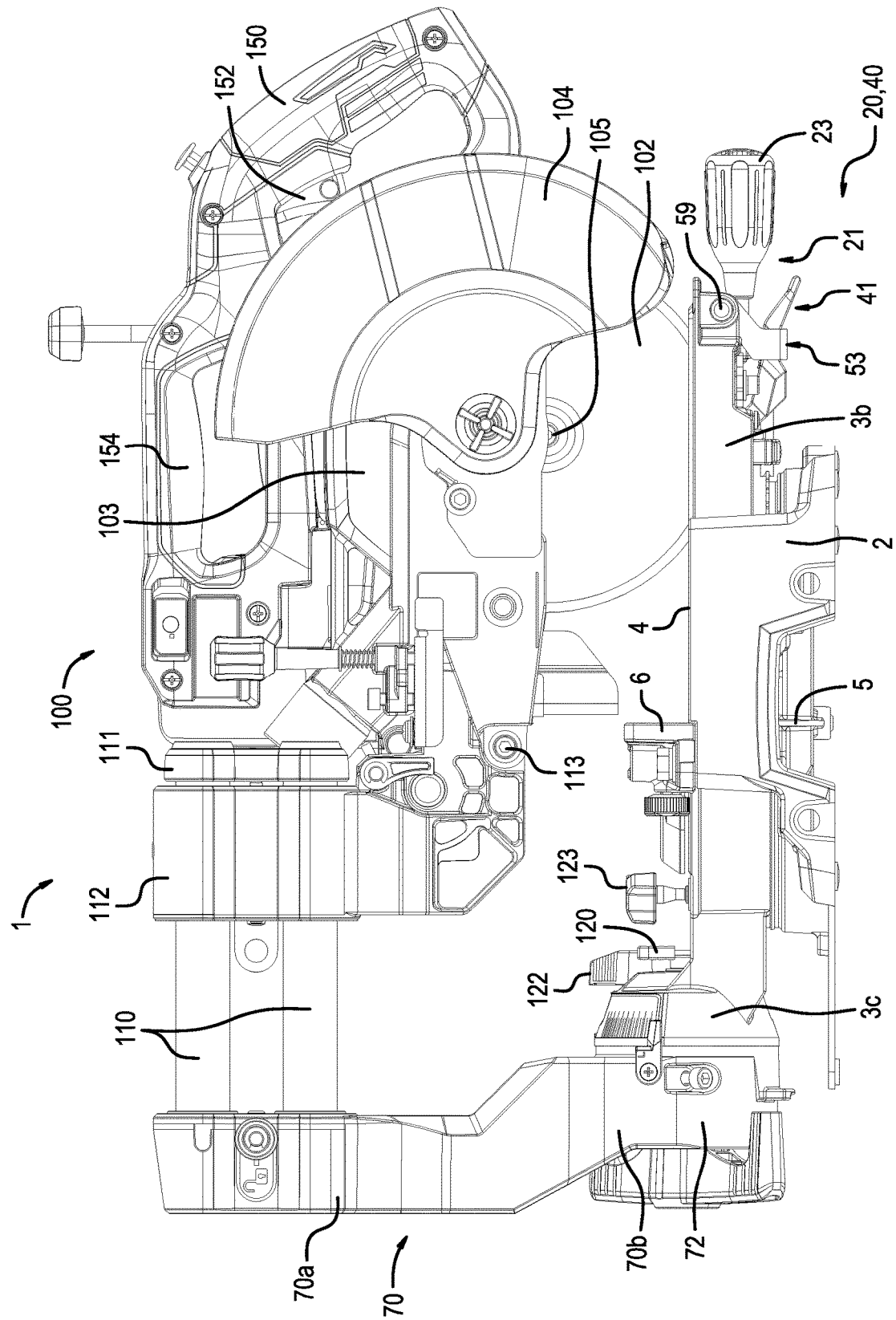
FIG. 2 is a left view of the benchtop cutting machine, in which a cutting-machine main body has been lowered to a lower-limit position.
Figure 3:
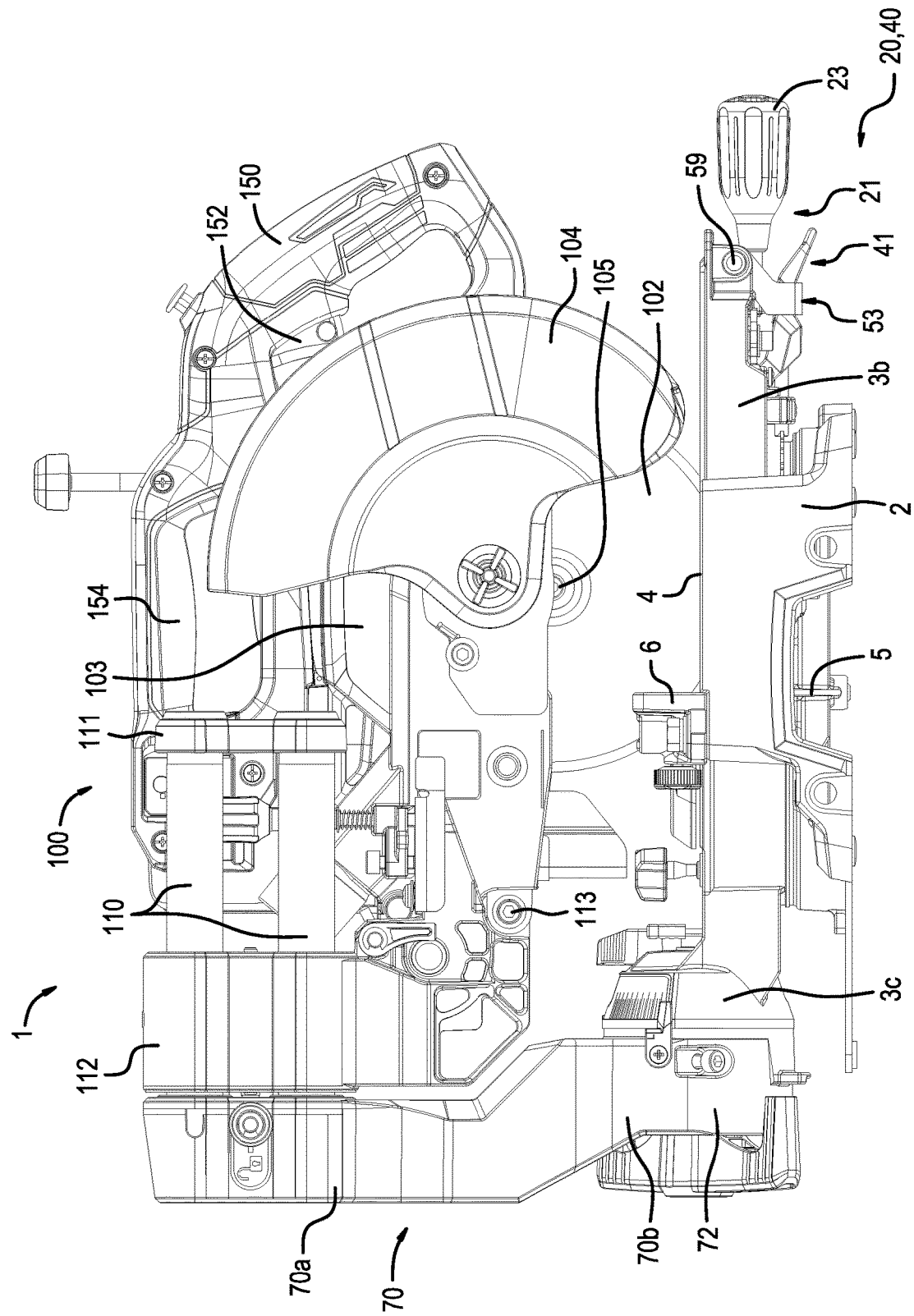
FIG. 3 is a left view of the benchtop cutting machine, in which the cutting-machine main body has been lowered to the lower-limit position and slid to a rearward-limit position.
Figure 4:
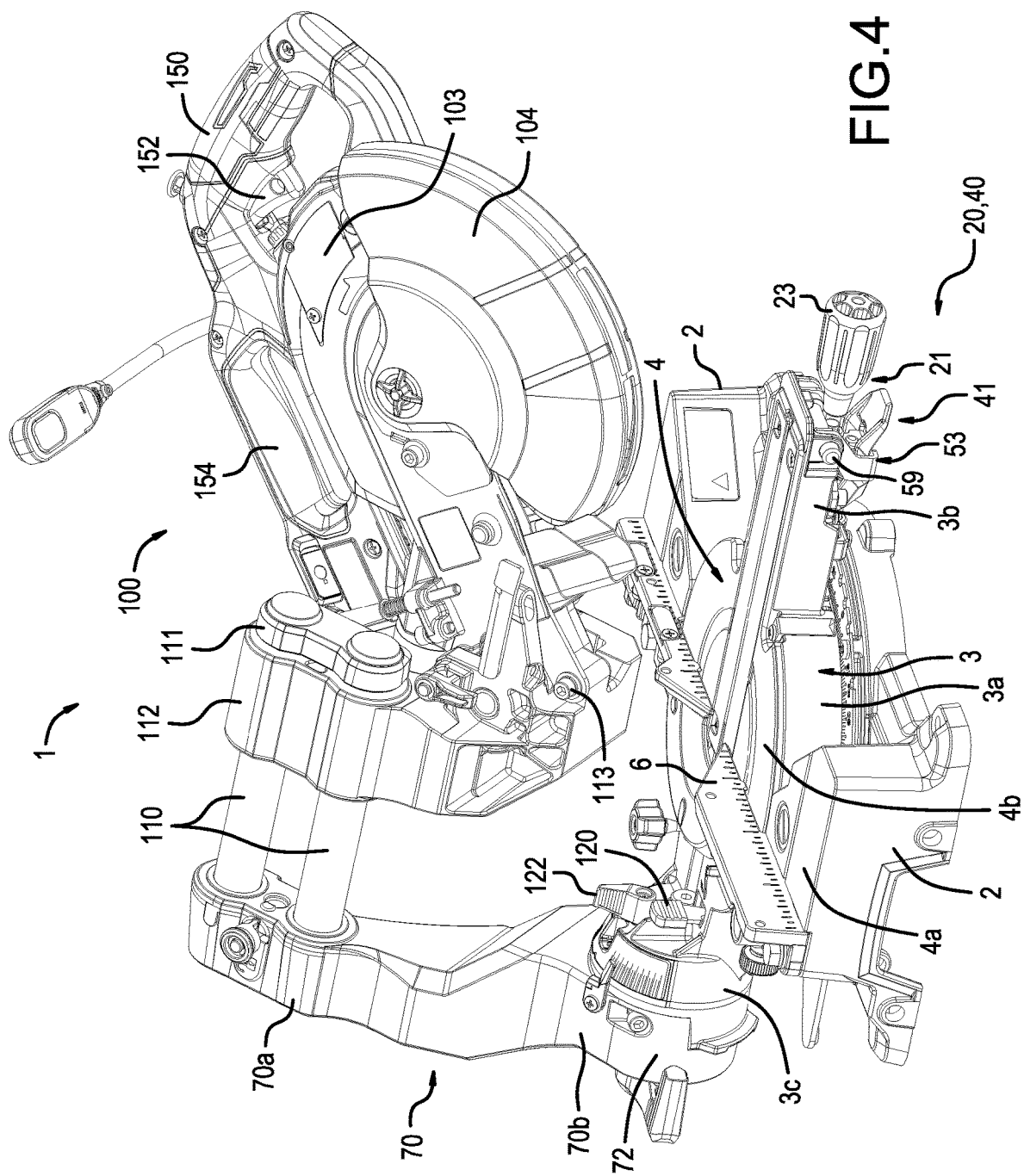
FIG. 4 is an oblique view, in which the benchtop cutting machine is viewed from the diagonal left-front side, wherein the cutting-machine main body is tilted to a 45°-clockwise position.
Figure 5:
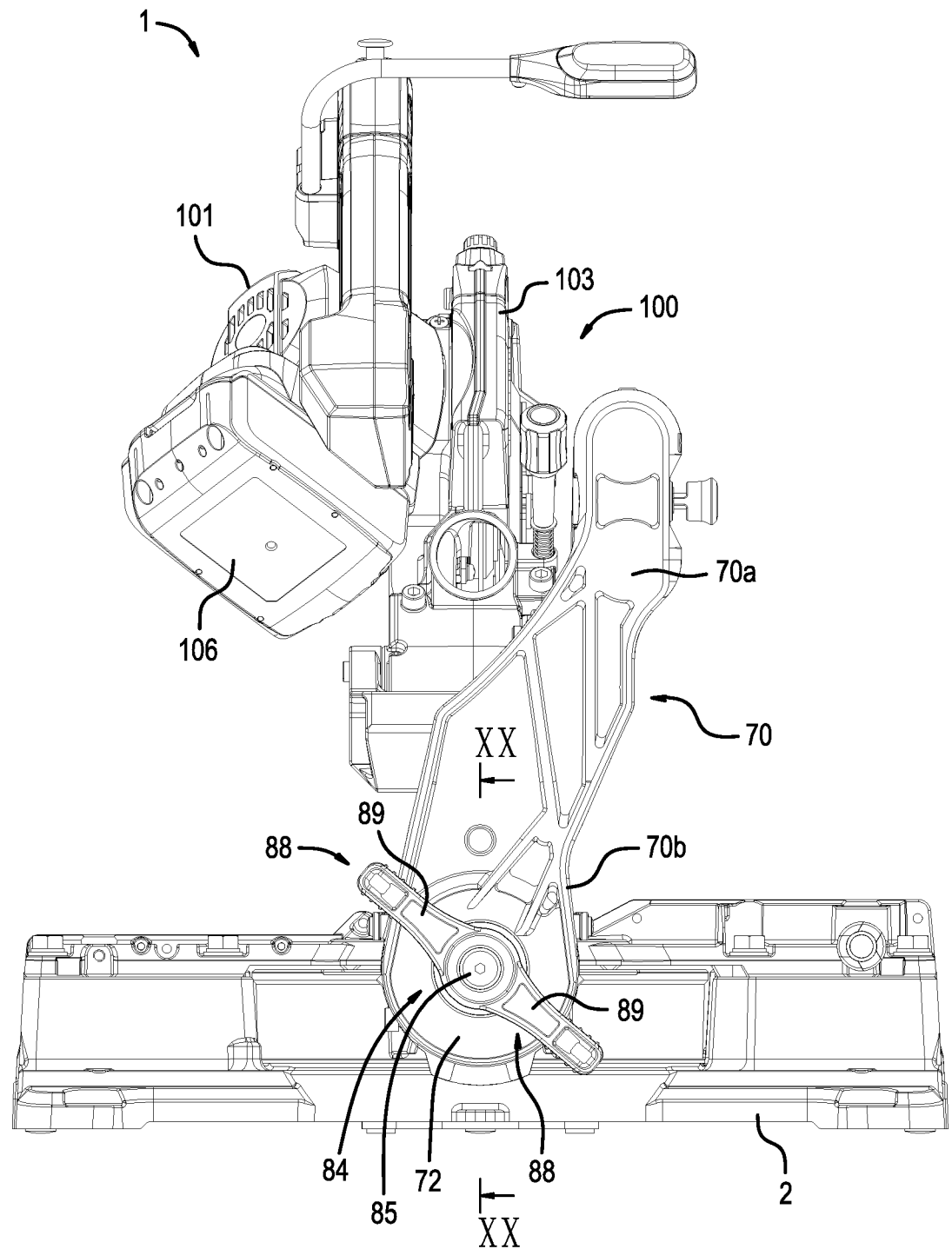
FIG. 5 is a rear view of the benchtop cutting machine.

Various embodiments of the present teachings will be explained below, with reference to the drawings. FIGS. 1 to 5 show the entirety of an exemplary benchtop cutting machine 1, which is known more specifically as a dual-bevel sliding compound miter saw, according to one exemplary embodiment of the present teachings. With reference to the view shown in FIG. 1, a user performs cutting work while standing rightward of the benchtop cutting machine 1. In other words, the user stands in front of a forward-protruding part (extension arm) 3b of a turntable 3 (in particular, when the miter angle is set to 0°). With regard to terms relating to the "front" and "rear" of structural elements of the benchtop cutting machine 1 in the explanation below, using the above-described location (standing position) of the user relative to the benchtop cutting machine 1 as a reference, the near side viewed from the user is defined as the front side (the user side), and the far side is defined as the rear side.

As shown in FIGS. 1 to 5, the benchtop cutting machine 1 comprises: a base 2, the turntable (turn base) 3, which is mounted on the base 2 such that it is rotatable in a horizontal plane relative to the base 2; and a cutting-machine main body (carriage) 100, which is pivotably connected to and disposed upward of the turntable 3. A top-plate surface (upper table surface) 4b of the turntable 3 and left and right top-plate surfaces (upper table surfaces) 4a of the base 2 are coplanar and thus together form the table surface 4 of the benchtop cutting machine 1. A workpiece to be cut by a cutting tool 102, which is rotatably mounted on the cutting-machine main body 100, is placed on the table surface 4. An example of the cutting tool 102 is a miter saw blade that has a disk shape. The cutting-machine main body 100 is capable of (i) pivoting upward and downward relative to the turntable 3 to cut the workpiece, (ii) tilting counterclockwise and clockwise (leftward and rightward) relative to the turntable 3 to make bevel cuts, and (iii) sliding (moving) forward and rearward relative to the turntable 3 to cut workpieces that are wider than the miter saw blade. More specifically, when the user pivots (pushes) the cutting-machine main body 100 downward, the cutting tool 102 cuts into the workpiece placed on the table surface 4 of the turntable 3 and the base 2. If the cutting-machine main body 100 is slid rearward while the cutting tool 102 is cutting the workpiece, the cutting of the workpiece can advance in the rearward direction.

Cutting-Machine Main Body or Carriage

The cutting-machine main body (carriage) 100 comprises the cutting tool 102, which has a disk shape and cuts the workpiece when it is rotated. An upper-side semicircular portion of the cutting tool 102 is covered by a fixed blade cover 103, and a lower-side semicircular portion is covered by a movable blade cover 104, which is supported such that it is capable of rotating relative to the fixed blade cover 103. The movable blade cover 104 opens and closes in conjunction with up and down movements, respectively, of the cutting-machine main body 100. When the cutting-machine main body 100 is at the upward standby position, the movable blade cover 104 is closed, which means that the movable blade cover 104 surrounds the lower portion of the cutting tool 102. As the cutting-machine main body 100 is lowered (pivoted downwardly) from the standby position, the movable blade cover 104 gradually opens (pivots upwardly) until the lower portion of the cutting tool 102 is completely exposed when the cutting-machine main body 100 reaches its lower-limit position so that the exposed lower portion of the cutting tool 102 can cut into the workpiece.

A DC electric motor 101 that rotates the cutting tool 102 when operated, a controller that controls the operation of the electric motor 101, a cooling fan that cools the controller, etc. are installed within a housing of the cutting-machine main body 100. A battery pack 106 for supplying power to the DC electric motor 101 is detachably mounted on the cutting-machine main body 100. The rotational power output from a motor shaft of the electric motor 101 transits a speed-reduction gear transmission and is transmitted to a spindle 105, which is rotatably supported by the housing. An end part of the spindle 105 protrudes from the center of the fixed blade cover 103, and the cutting tool 102 is mounted on this protruding portion. A main handle 150, which the user grasps when performing cutting work, and a carrying handle 154, which the user grasps when carrying the benchtop cutting machine 1, are provided on an upper portion of the fixed blade cover 103. A switch lever 152 is disposed on the main handle 150. When the switch lever 152 is pulled toward the near side by a finger of the user's hand that is grasping the main handle 150, the electric motor 101 starts and the cutting tool 102 rotates.

Turntable

The turntable (turn base) 3 is supported, via a rotary spindle 5 that is provided at substantially the center of the base 2, such that it is rotatable in a horizontal plane relative to the base 2. A positioning fence (guide fence) 6 for positioning the workpiece in the front-rear direction is provided on the base 2 such that the positioning fence 6 extends from both the left and the right sides of the base 2 toward the center of the upper side of the turntable 3. By rotating or turning the turntable 3 relative to the base 2, the orientation of the cutting tool 102 relative to the workpiece, which contacts and is thereby positioned by the positioning fence 6, can be changed. That is, miter cuts can be performed by changing the rotational position of the turntable 3 relative to the base 2 owing to the fact that the cutting tool 102 is connected to (and rotates with) the turntable 3 via a support arm 70, which will be further described below.

A strip-shaped kerf board 7, which has a slot formed therein, is provided on the turntable 3. The slot of the kerf board 7 extends from the vicinity of the center of rotation of the turntable 3 to the forward-protruding part (extension arm) 3b. The lower end of the cutting tool 102 can be lowered through this slot downward lower than the table surface 4b. The upper surface of the kerf board 7 is disposed such that it is coplanar with the table surface 4b of the turntable 3. Underneath the kerf board 7, the turntable 3 has a concave surface 8 (see FIG. 11), which curves downward as viewed from the front. This concave surface 8 forms or defines a space for receiving the lower end of the cutting tool 102 because the concave surface 8 recesses downward from the table surface 4b. The concave surface 8 has a bottom portion 8b, which is horizontal when viewed from the front, and a front-end portion 8a, which is curved such that it is higher in the front.

In each of FIGS. 1 to 5, the turntable 3 is located at a center position (miter angle position: 0°). The turntable 3 can be rotated in the horizontal plane relative to the base 2 until the forward-protruding part 3b contacts the base 2. For example, the turntable 3 may have an angular range of approximately 60° to the left of the center position and approximately 60° to the right of the center position, i.e. a total angular rotational range of 120° relative to the base 2. An angle scale (miter angle scale) 9 for indicating the rotational position (miter angle) of the turntable 3 is depicted on a front portion of the base 2. A pointer 10 is provided on a circular part 3a of the turntable 3. The angular position of the turntable 3 can be confirmed by reading the position at which the pointer 10 points to the angle scale 9.

Locking Rotation of the Turntable Relative to the Base

Figure 6:
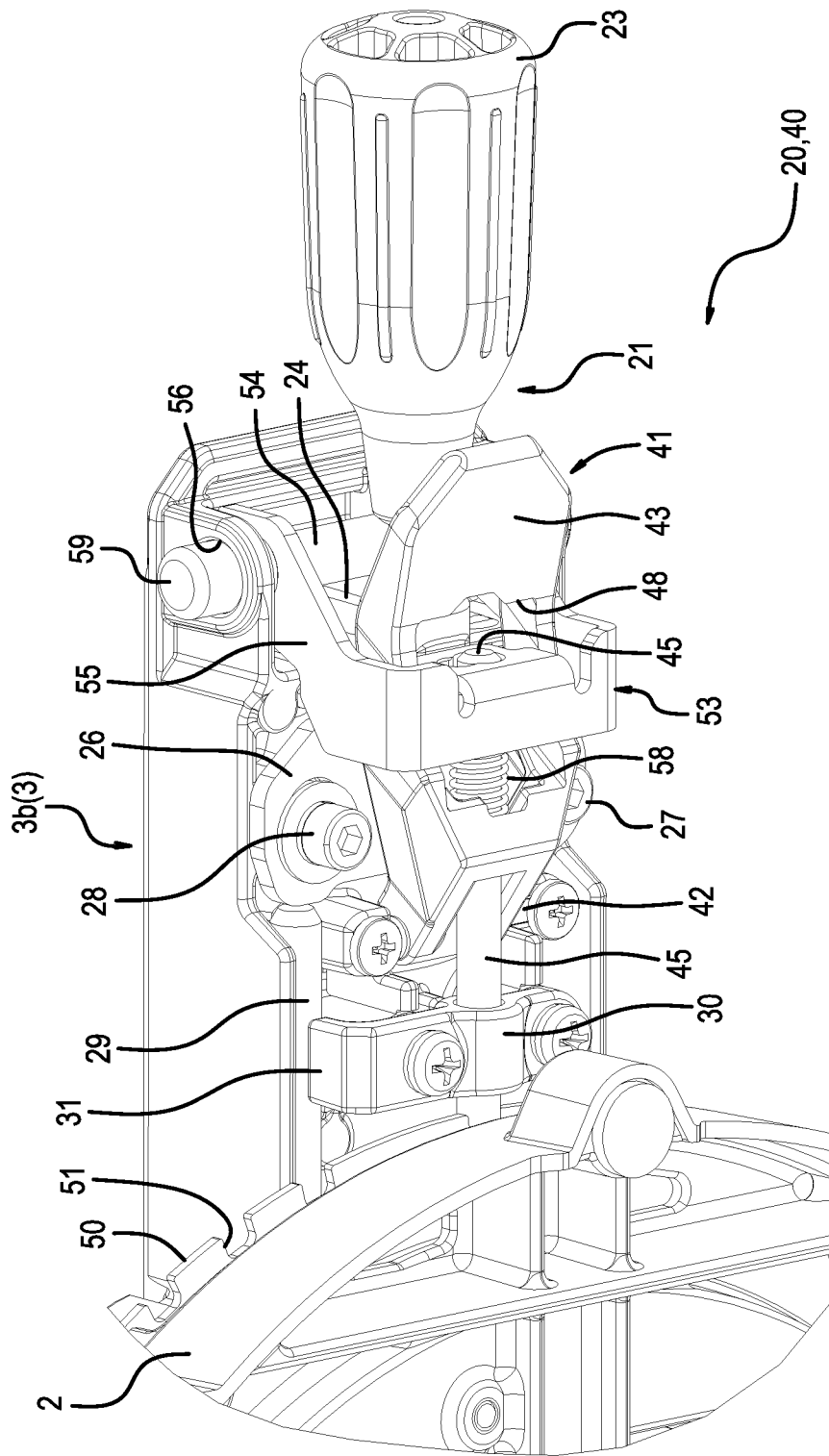
FIG. 6 is an oblique view in which first and second rotation-locking mechanisms, which are provided on a forward-protruding portion of a turntable, are viewed from the diagonal lower left.
Figure 7:
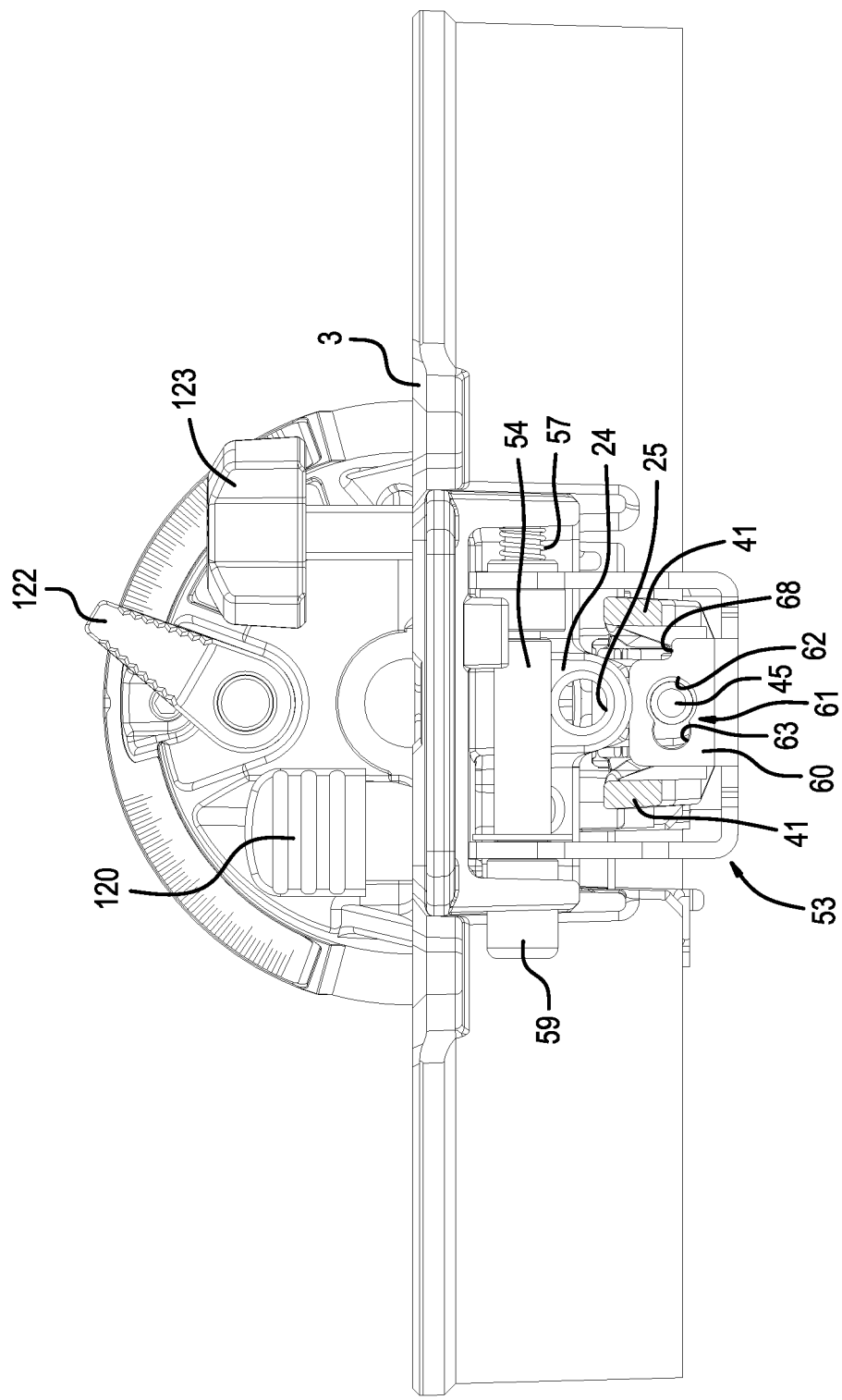
FIG. 7 is a front view of the first and second rotation-locking mechanisms, in which a manipulatable knob of the first rotation-locking mechanism has been removed to show structures behind the manipulatable knob.

As shown in FIGS. 6 and 7, the turntable 3 can be locked at a fixed angular (miter) position relative to the base 2 by using one or both of a first rotation-locking mechanism 20 and a second rotation-locking mechanism 40. If the first rotation-locking mechanism 20 is used to set the angular position (miter angle), then the turntable 3 can be locked at any arbitrary angular (miter) position within its rotatable range. On the other hand, if the second rotation-locking mechanism 40 is used to set the angular position (miter angle), then the turntable 3 can be quickly and accurately locked (positively locked, also known as a "positive stop function") at one of a plurality of prescribed angular positions (miter angles) corresponding to recesses 51 defined in an engagement plate (lock plate) 50, which will be further described below. It is noted that, at those prescribed miter angles, the turntable 3 can also be locked using the first rotation-locking mechanism 20 instead of or in addition to the second rotation-locking mechanism 40. The prescribed angular positions (i.e. the recesses 51) may be set, for example, in 10° steps within the rotatable range of the turntable 3. In the alternative, the prescribed angular positions (i.e. the recesses 51) may be set at miter angles that are commonly used in miter cutting operations, such as 0°, 15°, 22.5°, 31.6°, 45°, and 60°. The first and second rotation-locking mechanisms 20, 40 are both provided between the front portion of the circular part 3a (FIG. 1) and the forward-protruding part 3b of the turntable 3, and their manipulatable (manually movable) portions are disposed such that they are centralized at a tip portion of the forward-protruding part 3b. The first rotation-locking mechanism 20 can be locked and unlocked by rotating a manually manipulatable knob (grip) 23 about its axis. The second rotation-locking mechanism 40 can be locked and unlocked by moving (pivoting) a lock-release lever (or simply "release lever") 41 up and down.

Figure 10:
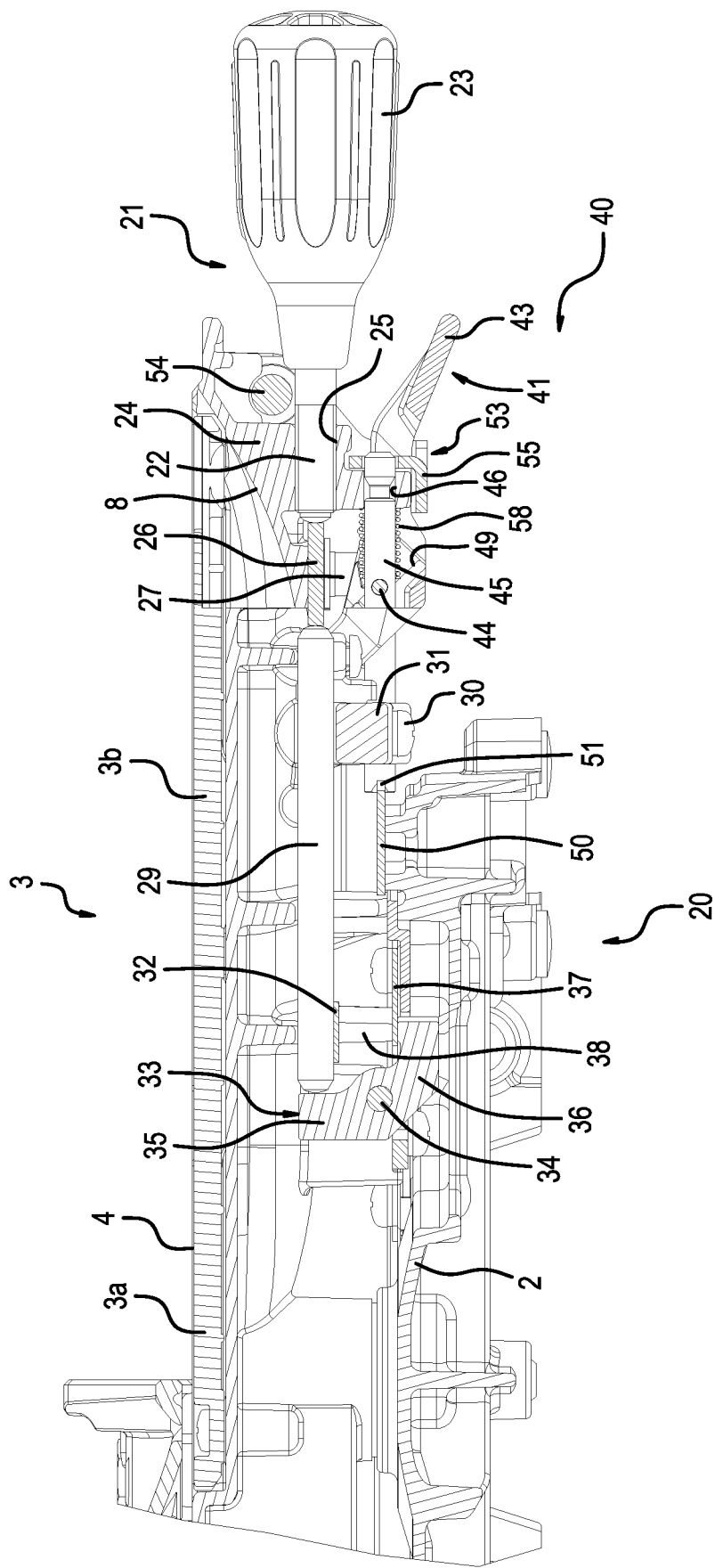
FIG. 10 is a cross-sectional view, in which the second rotation-locking mechanism is cut along line X-X in FIG. 8 and viewed from the left side; thus, FIG. 10 also shows, e.g., a transmission rod 29 of the first rotation-locking mechanism that extends parallel to line XI-XI in FIG. 8.

First Rotation-Locking Mechanism As shown in FIGS. 6 and 10, a manipulatable member (manually movable portion) 21 of the first rotation-locking mechanism 20 comprises a screw shaft 22 and the manipulatable knob (grip) 23, which is integrally mounted on the near side thereof. The manipulatable knob 23 functions not only for the purpose of locking rotation but also as a rotational-manipulatable member (i.e. a handle) that the user grasps when rotating (turning) the turntable 3 relative to the base 2. The screw shaft 22 is screwed into a screw hole 25 of a front-side support body 24, which extends downward from the front portion of the turntable 3. The manipulatable member 21 advances and retreats in its axial direction by rotating the screw shaft 22 about its longitudinal (rotational) axis. More specifically, owing to the fact that the threaded screw shaft 22 is screwed into the threaded screw hole 25, the manipulatable member 21 is displaced rearward when rotated in a locking direction (clockwise when viewed from the front side) and is displaced frontward when rotated in a lock-releasing direction (counterclockwise when viewed from the front side).

A transmission plate 26, which is pivotable in a horizontal plane, is disposed on the rear side of the screw shaft 22. The transmission plate 26 is composed of a strip-shaped steel plate that is elongated in the left-right direction. The transmission plate 26 has a circular hole on the right side and a slotted hole, which is elongated in the front-rear direction, on the left side, and is mounted on a lower surface of the turntable 3 by fixing screws 27, 28, which pass through the circular hole and the slotted hole, respectively. Owing to the slotted hole on the left side, the transmission plate 26 is pivotable in the horizontal plane about the fixing screw 27, which is on the right side.

The rear end of the screw shaft 22 makes contact with a front edge of a center portion of the transmission plate 26. When the manipulatable member 21 is rotated in the locking direction and the screw shaft 22 is displaced rearward, the center portion of the transmission plate 26 is pushed rearward. Because the fixing screw 27 serves as a pivot point for the transmission plate 26, the transmission plate 26 will pivot about the fixing screw 27 when pressed by the screw shaft 22 so that the left-side portion of the transmission plate 26 is displaced rearward.

On the rear side of the left-side portion of the transmission plate 26, a transmission rod 29 is disposed such that it extends in the front-rear direction, i.e. in parallel to the kerf boards 7 and the screw shaft 22. The transmission rod 29 is supported, such that it is displaceable along its axial direction, by a rod-receiving part 31 of a rear-side support body 30 and a rod-receiving member 32, which is rearward, both of which are provided on the lower surface of the turntable 3, as can be seen in FIG. 10. The transmission rod 29 is disposed such that it is parallel to and offset leftward of the screw shaft 22, as is apparent from FIGS. 6 and 8. A front end of the transmission rod 29 makes contact with the left-side portion of the transmission plate 26. Consequently, when the transmission plate 26 pivots about the fixing screw 27 and the left-side portion thereof is displaced rearward, the transmission rod 29 is pushed by the left-side portion and is displaced rearward. Owing to the rearward displacement of the left-side portion of the transmission plate 26, the transmission rod 29 is displaced rearward.

As can be seen in FIG. 10, a turn stopper (locking member) 33 is disposed on (at) the rear side of the transmission rod 29. The turn stopper 33 is pivotably supported by the lower surface of the turntable 3 via a support shaft 34, which extends in the left-right direction (i.e. perpendicular to the axial direction of the transmission rod 29). The turn stopper 33 has an L shape and comprises an upward arm 35, which extends upward from the support shaft 34, and a forward arm 36, which extends forward from the support shaft 34. A rear end of the transmission rod 29 makes contact with the front surface of the upward arm 35 of the turn stopper 33. Consequently, when the transmission rod 29 is displaced rearward, the upward arm 35 is pushed rearward, which causes the turn stopper 33 to pivot, about the support shaft 34, to the locked side (miter angle locked position).

More specifically, when the upward arm 35 is pushed rearward and the turn stopper 33 pivots to the locked side, the forward arm 36 is displaced upward. A slide plate (interposed plate or miter lock plate) 37, which is fixed to the base 2 and extends arcuately, is located upward of the forward arm 36. A rib 38, which extends from the lower surface of the turntable 3, is located upward of the slide plate 37. Therefore, when the turn stopper 33 pivots to the locked side, the forward arm 36 thereof is displaced upward, thereby squeezing or clamping the slide plate 37 between the forward arm 36 and the rib 38 and causing the turntable 3, which supports the forward arm 36 and the rib 38, to be locked relative to the base 2, which supports the slide plate 37.

As explained above, the rotational motion of the manipulatable member 21 is converted into the squeezing or clamping motion of the turn stopper 33 via the transmission plate 26 and the transmission rod 29, which serve as transmission members. Because locking of the miter angle position is effected by the squeezing or clamping of the slide plate 37 of the base 2, which extends continuously in the circumferential direction, the turntable 3 can be locked at an arbitrary angular (miter) position within the stipulated angular rotational range.

Second Rotation-Locking Mechanism

Figure 11:
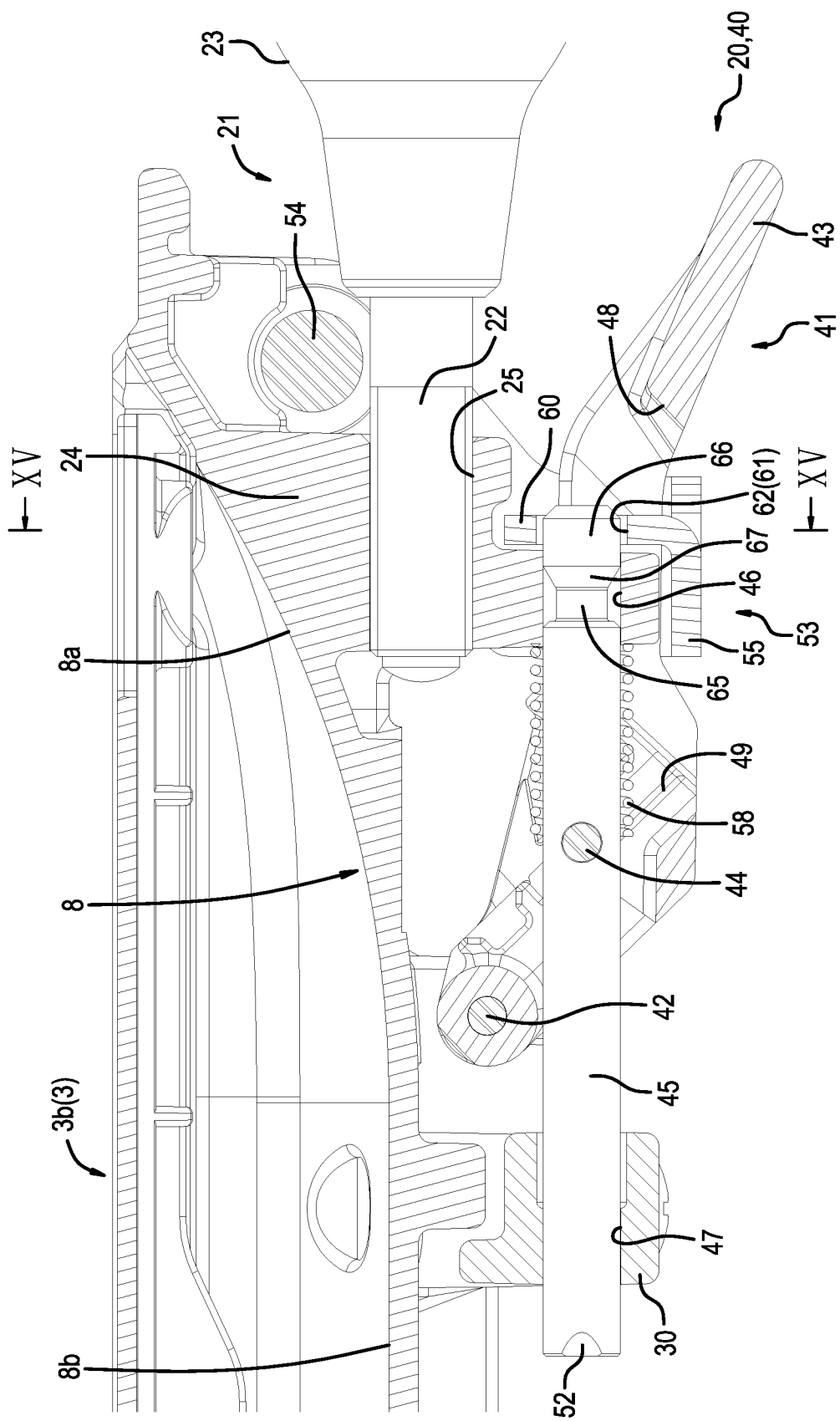
FIG. 11 is an enlarged, cross-sectional view, in which the second rotation-locking mechanism is cut along line XI-XI in FIG. 8 and viewed from the left side, wherein a lock-release lever is located at its downward locked position.

As shown in FIGS. 6-11, the lock-release lever (release lever) 41 of the second rotation-locking mechanism 40 is supported such that it pivotable in the up-down direction about a pivot shaft (center of rotation or pivot center) 42, which is mounted rearward thereof on the lower surface of the turntable 3. When viewed in the front-rear direction (more specifically, when the forward-protruding part 3b of the turntable 3 is aligned with the front-rear direction), the pivot shaft 42 is disposed between the front-side support body 24 and the rear-side support body 30, as can be seen in FIG. 11. In addition, the pivot shaft (center of rotation or pivot center) 42 is disposed upward of a locking pin 45, which is further described below. A manipulatable portion (manually graspable portion) 43, which the user's finger(s) grasp(s) to pull up the lock-release lever 41, is provided on a front portion of the lock-release lever 41. The manipulatable portion 43 is located rearward and downward of the manipulatable knob 23. Consequently, while grasping the manipulatable knob 23 with one hand, the user can pull up the lock-release lever 41 using a finger (e.g., the index finger) of the same hand.

Figure 12:
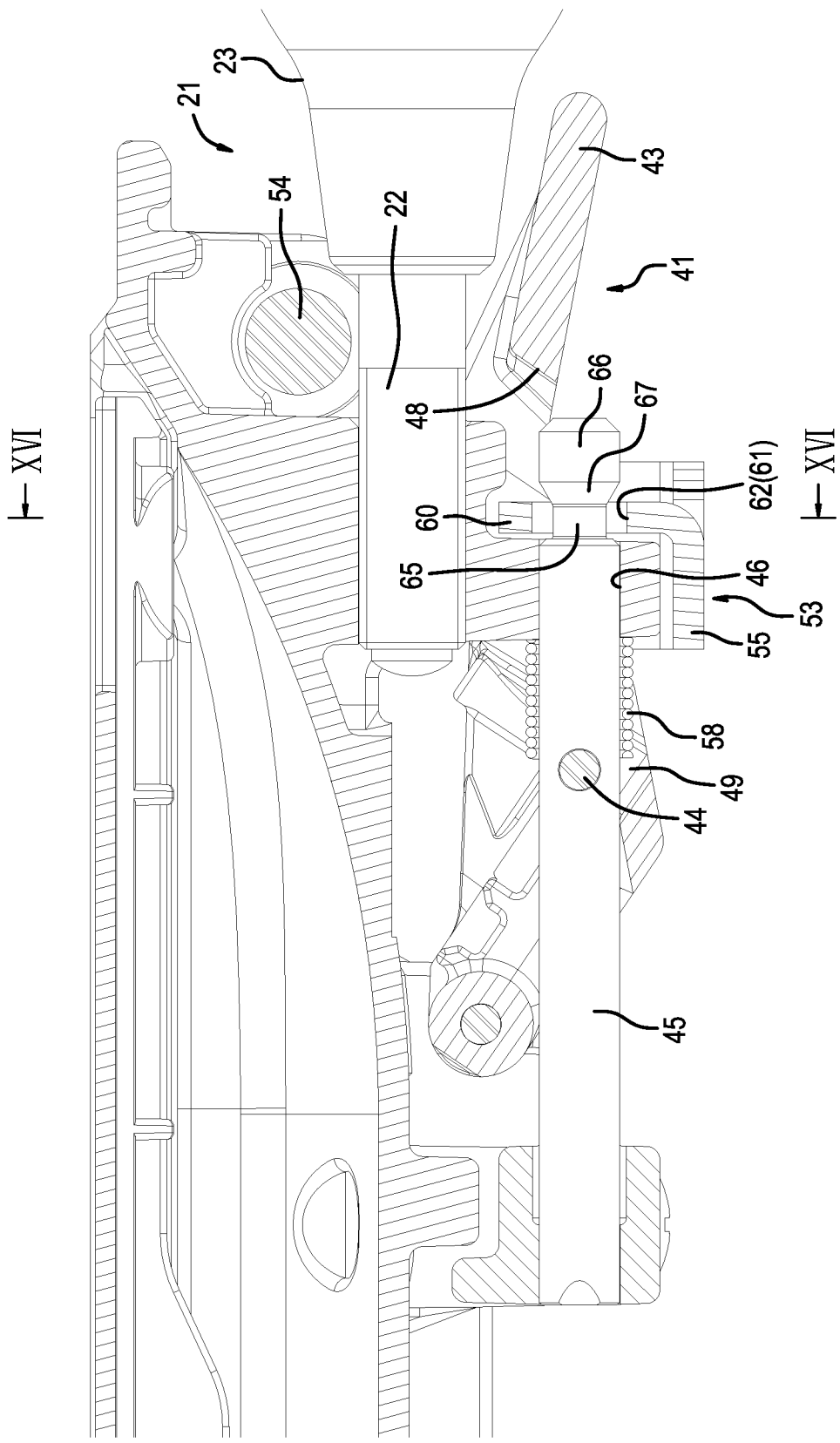
FIG. 12 is an enlarged, cross-sectional view of the second rotation-locking mechanism, in which the lock-release lever has been pulled up to an upper-limit position.

As shown in FIGS. 6, 11, and 12, forward of the pivot shaft 42, the locking pin 45 interacts with the lock-release lever 41 via an engaging pin 44. The engaging pin 44 has a diameter smaller than the diameter of the locking pin 45, transversely passes through the locking pin 45 in the left-right direction (i.e. perpendicular to the axial or longitudinal direction of the locking pin 45), and protrudes from both the left and right sides thereof. The locking pin 45 is inserted through a support hole 46 of the front-side support body 24 and a support hole 47 of the rear-side support body 30 and is supported such that it is displaceable (slidable) forward and rearward (i.e. in the axial or longitudinal direction of the locking pin 45). The lock-release lever 41 has a vertically extending circumvention hole (central opening) 48 for circumventing (avoiding contact with) the front-side support body 24 when the lock-release lever 41 is pivoted upwardly. That is, the circumvention hole 48 is sized so that the lock-release lever 41 does not contact the support body 24 or the disengagement-holding member 53 when the user lifts up the manipulatable portion 43 and pivots the lock-release lever 41 upwardly. The locking pin 45 passes through a rear wall of the lock-release lever 41 (more precisely, between two prongs (legs) 41P that are pivotably mounted on the pivot shaft 42), and a front-side end portion of the locking pin 45 protrudes into the circumvention hole 48 (as can be seen in FIG. 6). The locking pin 45 is disposed parallel to and offset downward of the screw shaft 22 of the manipulatable member 21 of the first rotation-locking mechanism 20, which was described above. Accordingly, in the middle of the front-side support body 24, the support hole 46, through which the locking pin 45 is inserted, is located downward of the screw hole 25, into which the screw shaft 22 is screwed.

The lock-release lever 41 has a tilted surface 49, which faces frontward and upward. The tilted surface 49 is defined centrally along the rear wall of the lock-release lever 41 (more precisely, along the two prongs (legs) 41P that are pivotably mounted on the pivot shaft 42). A compression spring 58 is mounted around the locking pin 45 and is held between the left and right protruding portions of the engaging pin 44 and a rear surface of the front-side support body 24. Owing to the spring force of the compression spring 58, the locking pin 45 is biased rearward via the engaging pin 44. Consequently, the manipulatable portion 43 of the lock-release lever 41 is biased downward (toward the locked side) owing to the engaging pin 44 pushing the tilted surface 49 rearward and thereby causing the lock-release lever 41 to pivot about the pivot shaft 42 to its lower-limit position.

The lock-release lever 41 can be manually pulled up to the lock release side against the bias of the compression spring 58. When the lock-release lever 41 is manually pulled up, the engaging pin 44 is pushed forward by the tilted surface 49, thereby displacing the locking pin 45 forward (i.e. along the axial or longitudinal direction of the locking pin 45). When the pull-up force applied to the lock-release lever 41 is released, the locking pin 45 returns rearward owing to the biasing force of the compression spring 58.

Figure 8:
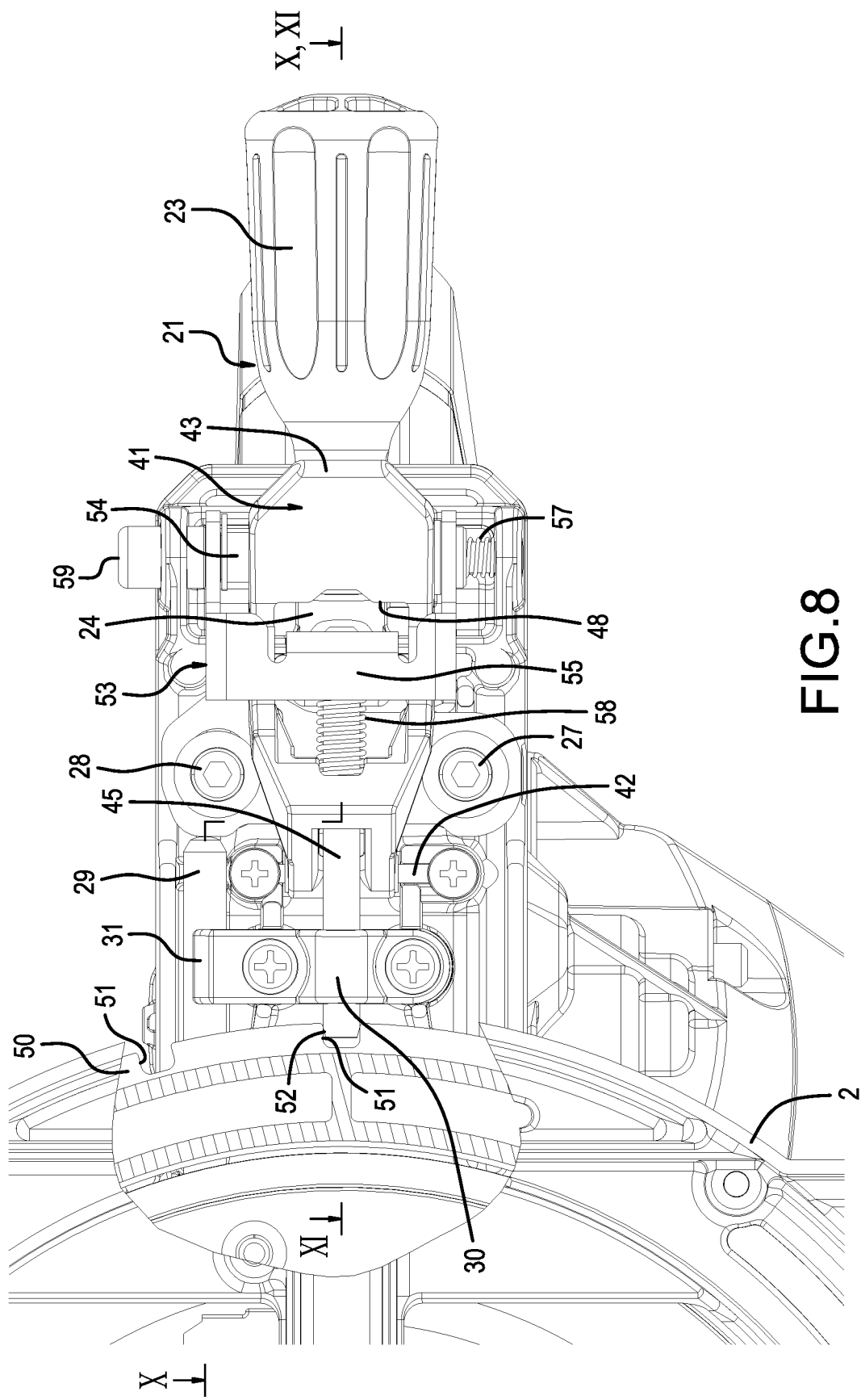
FIG. 8 is a bottom view of the first and second rotation-locking mechanisms, in which a locking pin of the second rotation-locking mechanism is engaged with one of the recesses defined in an engagement plate attached to a base.
Figure 9:
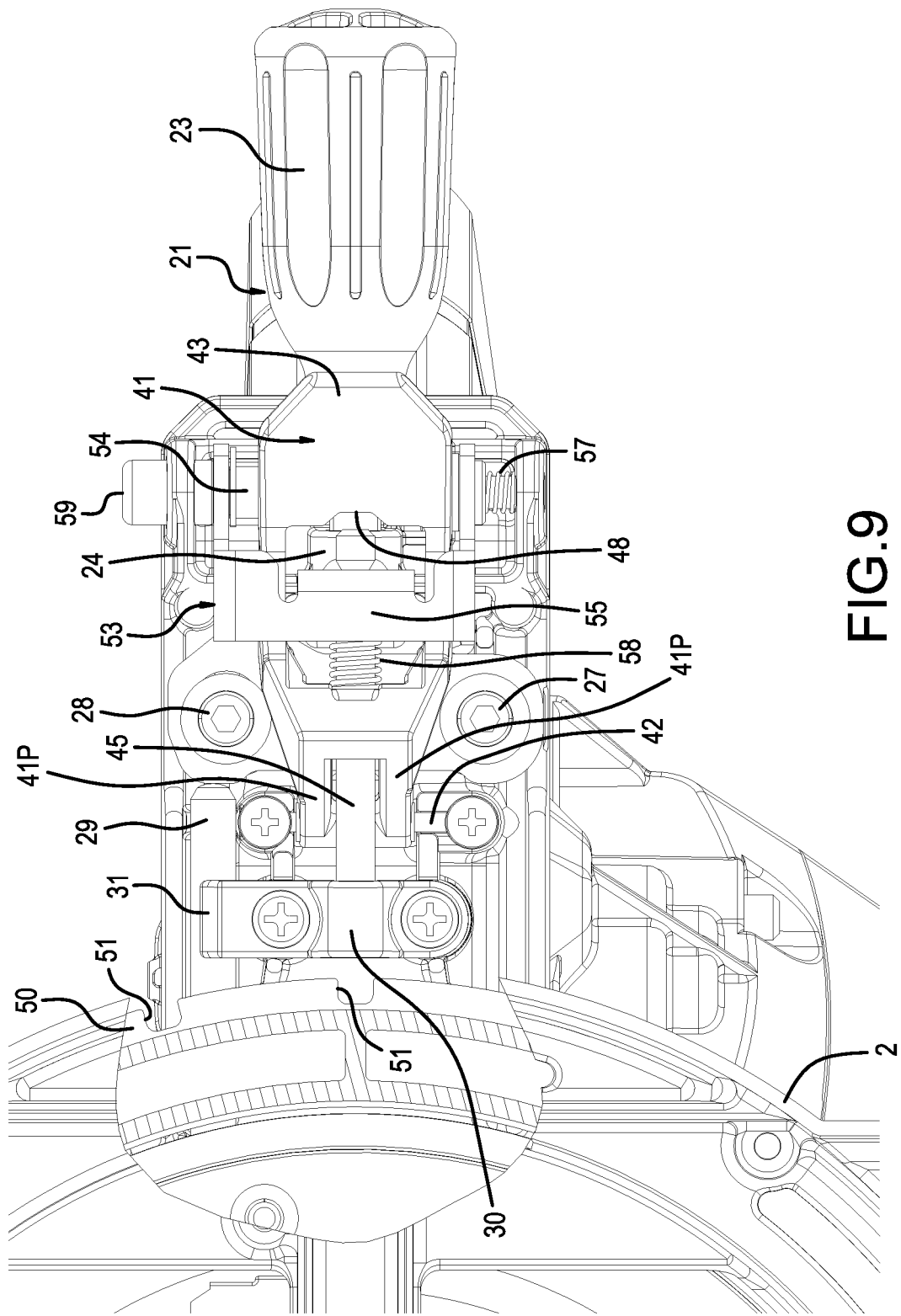
FIG. 9 is a bottom view of the first and second rotation-locking mechanisms, in which the locking pin of the second rotation-locking mechanism is disengaged from the recess.

As shown in FIGS. 8-10, an arcuately-extending engagement plate (lock plate or miter scale plate) 50 is mounted on the base 2 at the same height as the locking pin 45, and a plurality of the above-mentioned recesses 51 is provided along (in) a circumferential edge of the engagement plate 50. When the locking pin 45 is displaced rearward and a rear-side tip thereof advances into one of the recesses 51, the locking pin 45 is held at an advanced position (locked position) owing to the biasing force of the compression spring 58, and thereby the turntable 3 is locked, relative to the base 2, at the miter angle corresponding to that engaged recess 51. When the locking pin 45 is displaced forward and comes out of the recess 51, the turntable 3 is unlocked and becomes rotatable relative to the base 2 again.

As can be seen in FIG. 8, sloped surfaces 52 are respectively formed (defined) on the left and right of a rearward tip portion of the locking pin 45, and the sloped surfaces 52 are preferably chamfered or beveled to be flat in order to be complementary (correspond) to the flat, vertically extending side surfaces of the recesses 51. Therefore, when the rearward tip portion of the locking pin 45 advances into one of the recesses 51, the left and right sloped surfaces 52 respectively contact the left and right edges (vertical sides) of the respective recess 51. At this time, the sloped surfaces 52 of the locking pin 45 and the edges of the recesses 51 make contact (line contact), on both the left and right sides, along two straight lines oriented in the up-down direction. Accordingly, as compared to known embodiments in which the tip of the locking pin 45 is beveled conically, force in the up-down direction from the locking pin 45 tends not to be applied to the engagement plate 50, and thereby the engagement plate 50 tends not to bend or displace.

Disengagement-Holding Member

Figure 13:
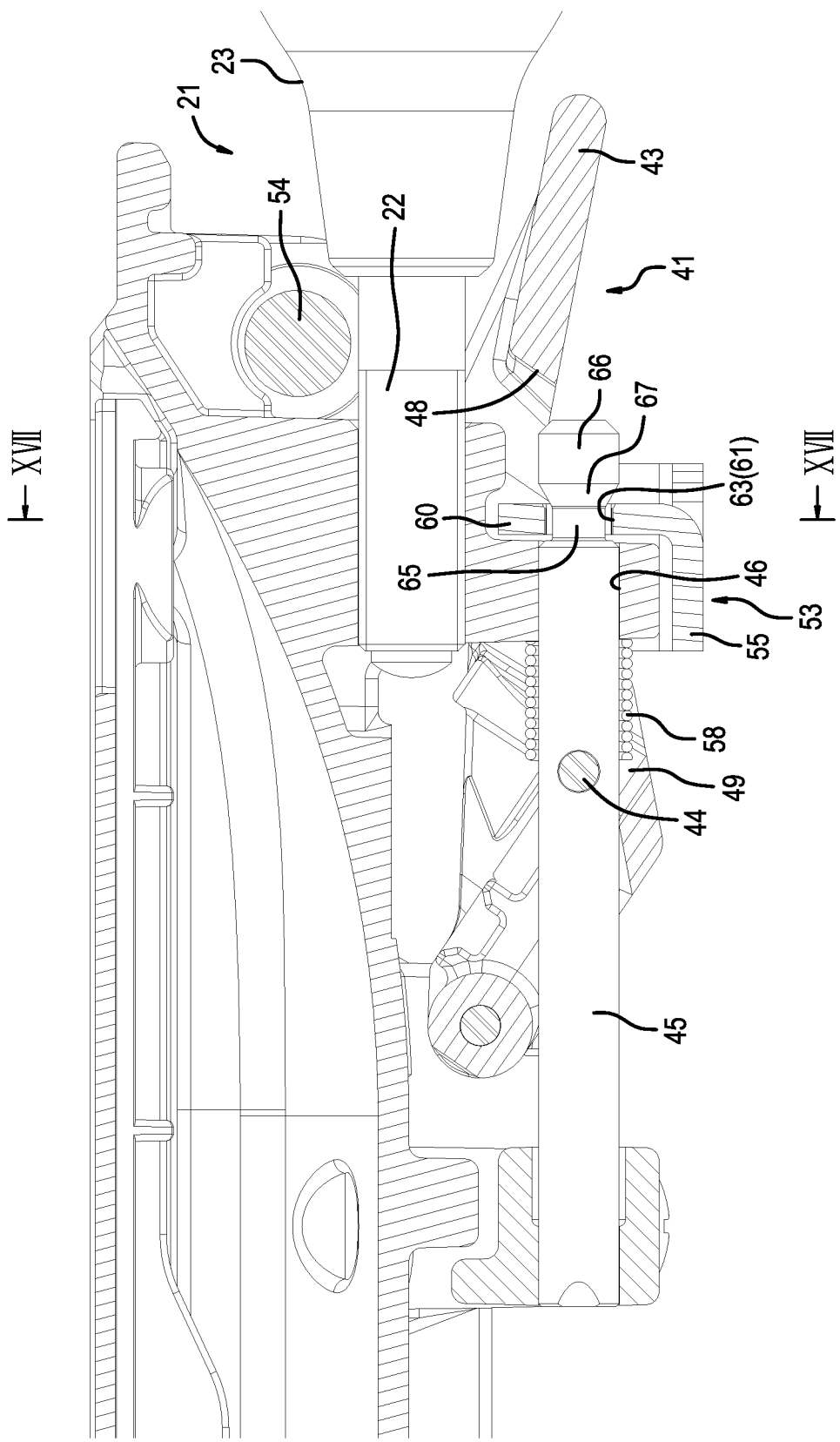
FIG. 13 is an enlarged, cross-sectional view of the second rotation-locking mechanism, in which a disengagement-holding member has been slid to its latching position with the lock-release lever pulled up to its upper-limit position as is.
Figure 14:
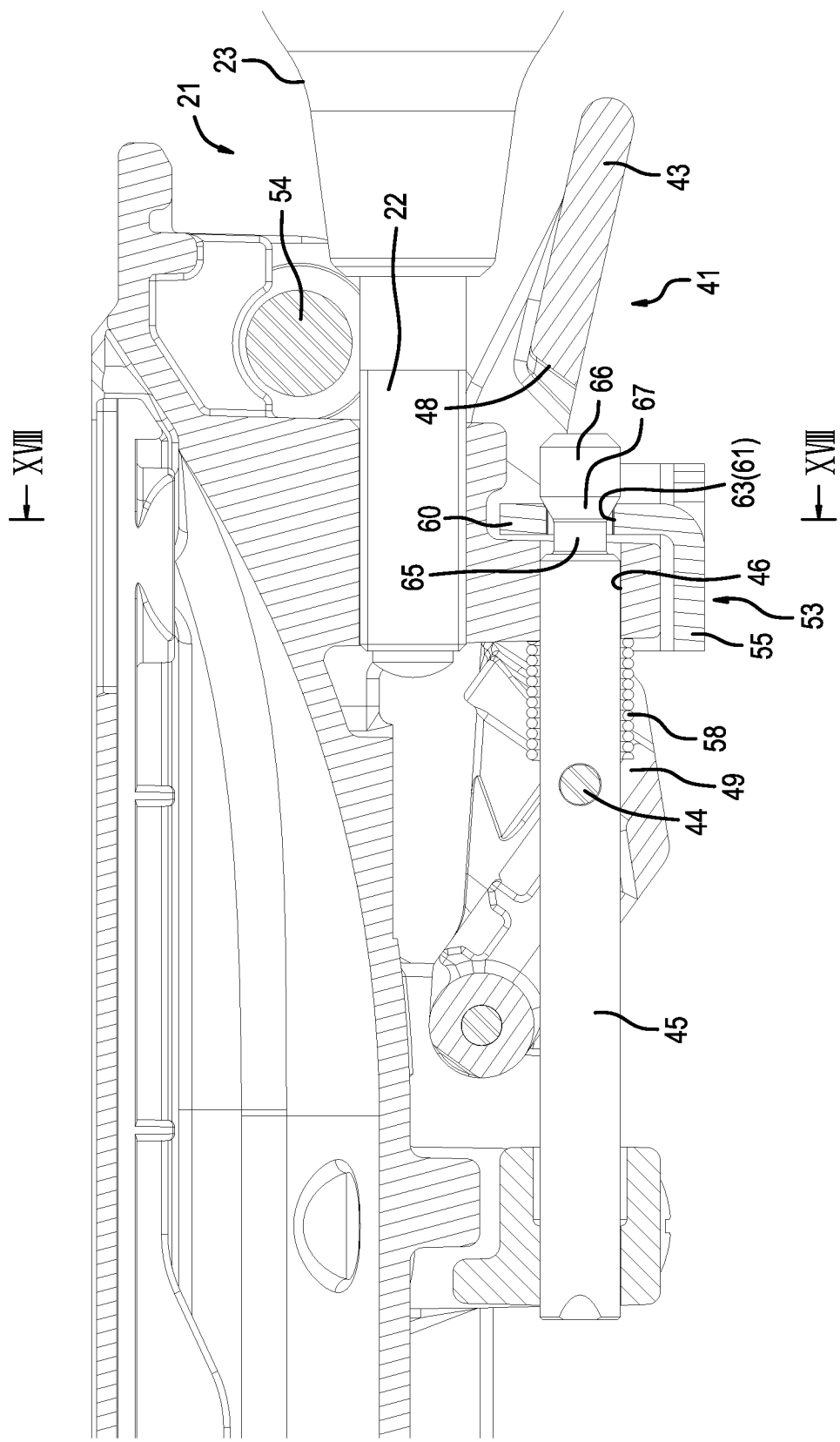
FIG. 14 is an enlarged, cross-sectional view of the second rotation-locking mechanism, in which the pulling up of the lock-release lever has been released and a tapered surface of the locking pin is fitted in a latching hole of the disengagement-holding member, with the disengagement-holding member slid to the latching position as is.
Figure 15:
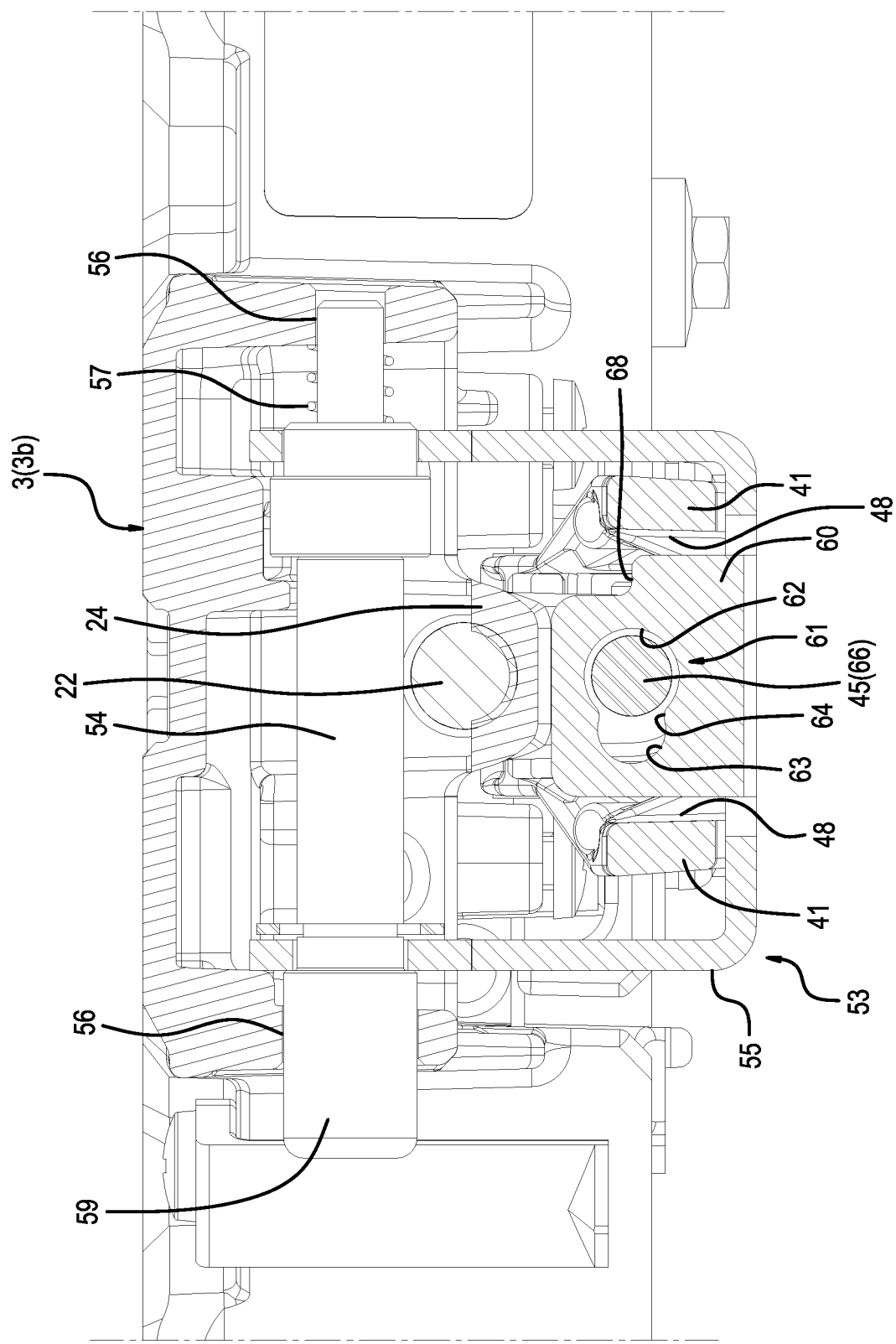
FIG. 15 is a cross-sectional view in which the second rotation-locking mechanism in FIG. 11 is cut along line XV-XV and viewed from the front side.

As shown in FIGS. 11 to 18, the locking pin 45 can be held at a disengagement position (i.e. an axial position of the locking pin 45 displaced away (spaced apart) from the recesses 51 such that the locking pin 45 can not engage in any of the recesses 51) by moving a disengagement-holding member 53 using a manipulatable button 59. Thereby, it is possible to easily maintain (hold) the state in which the locking pin 45 is separated (spaced apart) from the recesses 51 of the base 2, in which state the turntable 3 is rotatable relative to the base 2. As can be seen in FIG. 15, the disengagement-holding member 53 comprises an integral combination of an upper slide shaft 54 and a U-shaped plate (suspended part) 55 that is suspended from the slide shaft 54.

As can be seen, e.g., in FIGS. 6 and 15, the slide shaft 54 is passed through support holes 56 in left and right sidewalls of the forward-protruding part 3b of the turntable 3 and is supported such that it is slidable in the left-right direction, i.e. perpendicular to the axial directions of the screw shaft 22 and the locking pin 45. As a result, the disengagement-holding member 53 is movable (shiftable) in the left-right direction (i.e. perpendicular to the axial directions of the screw shaft 22 and the locking pin 45) between a releasing position, which is leftward (i.e. the position of the disengagement-holding member 53 shown, e.g., in FIG. 15), and a latching position, which is rightward (i.e. the position of the disengagement-holding member 53 shown, e.g., in FIG. 17). As viewed along the axial directions of the screw shaft 22 and the locking pin 45, the slide shaft 54 is disposed between the front end of the forward-protruding part 3b of the turntable 3 and the front-side of the support body 24. To describe the location of the slide shaft 54 (the support holes 56) more precisely, as can be seen, e.g., in FIG. 11, the slide shaft 54 is disposed in the dead space (i.e. space that otherwise would be empty, but is required so that the upper surface of the knob 8 does not protrude above the table surface 4) that exists upward of the height (level) of the horizontal bottom part 8b of the concave surface 8 of the turntable 3 and forward of the inclined front-end part 8a of the concave surface 8. The slide shaft 54 is stepped; i.e., a right end (FIG. 15) of the slide shaft 54 has a small-diameter portion. As can also be seen in FIG. 15, a compression spring 57 is mounted on the small-diameter portion of the slide shaft 54 and is held between a large-diameter portion of the slide shaft 54 and a right sidewall of the forward-protruding part 3b of the turntable 3. Therefore, the disengagement-holding member 53 is biased leftward (toward the releasing position side) by the compression spring 57. The manipulatable button 59, which the user presses to manipulate (move, push) the disengagement-holding member 53, is provided on a left end of the slide shaft 54. As will be further described below, when the lock-release lever 41 is located at (has been manually pulled to) its upper-limit position, the disengagement-holding member 53 can be moved (slide, shifted) rightward by pushing the manipulatable button 59. Because the manipulatable button 59 is located rearward and leftward of the manipulatable knob 23, it is possible for the user, while grasping the manipulatable knob 23 with the right hand, to push the manipulatable button 59 using the thumb of the same hand.

As can be seen in FIGS. 6, 11 and 15, a bottom portion of the U-shaped plate 55 extends underneath the lock-release lever 41 in the left-right direction. Consequently, the U-shaped plate 55 does not hinder the operation of pulling up the lock-release lever 41 and, moreover, the bottom portion of the plate 55 defines the lower-limit position (locked position) of the lock-release lever 41. Furthermore, the plate 55 has a standing part (vertically extending wall or latching part) 60, which extends upward from the bottom portion. When the lock-release lever 41 is located at the downward locked position (i.e. the resting position of the lock-release lever 41 shown, e.g., in FIG. 11), the standing part 60 protrudes through the circumvention hole 48 in the center of the lock-release lever 41 and above the upper side (upper surface) of the lock-release lever 41.

Referring again to FIG. 15, a latching hole 61 is formed in the standing part 60 of the plate 55. The latching hole 61 has a large-circle portion 62, which is on the right side, and a small-circle portion 63, which is on the left side and overlaps the large-circle portion 62. A constricted (narrower) portion 64 between the large-circle portion 62 and the small-circle portion 63 has a passageway width (distance in the up-down direction) that is smaller than the diameter of the small-circle portion 63. The standing part 60 faces the front side of the support body 24. Therefore, by moving the disengagement-holding member 53 in the left-right direction, either the large-circle portion 62 or the small-circle portion 63 of the latching hole 61 can be coaxially aligned with the support hole 46 of the support body 24. As can be seen in FIG. 11, because the diameter the locking pin 45 is narrowed in the vicinity of the near-side tip, the locking pin 45 has a small-diameter portion 65 and a large-diameter portion 66, which is forward thereof. The transition between the small-diameter portion 65 and the large-diameter portion 66 has a tapered surface 67. The diameter of the large-circle portion 62 of the latching hole 61 is larger than the diameter of the large-diameter portion 66 of the locking pin 45. Therefore, when the lock-release lever 41 is located at the downward locked position, the large-diameter portion 66 of the locking pin 45 is located at the middle of the large-circle portion 62 of the latching hole 61, as can be seen in FIG. 15. Because the passageway width of the constricted portion 64 of the latching hole 61 is smaller than the diameter of the large-diameter portion 66 of the locking pin 45, when the lock-release lever 41 is at the downward locked position, the disengagement-holding member 53 cannot be moved (shifted) to the rightward latching position. That is, even if the user attempts to press the manipulatable button 59 in the rightward direction in the state shown in FIG. 15, the disengagement-holding member 53 is blocked from moving (shifting) rightward to the latching position owing to the contact (abutment) of the large-diameter portion 66 of the locking pin 45 against the constricted portion 64 of the latching hole 61.

Figure 16:
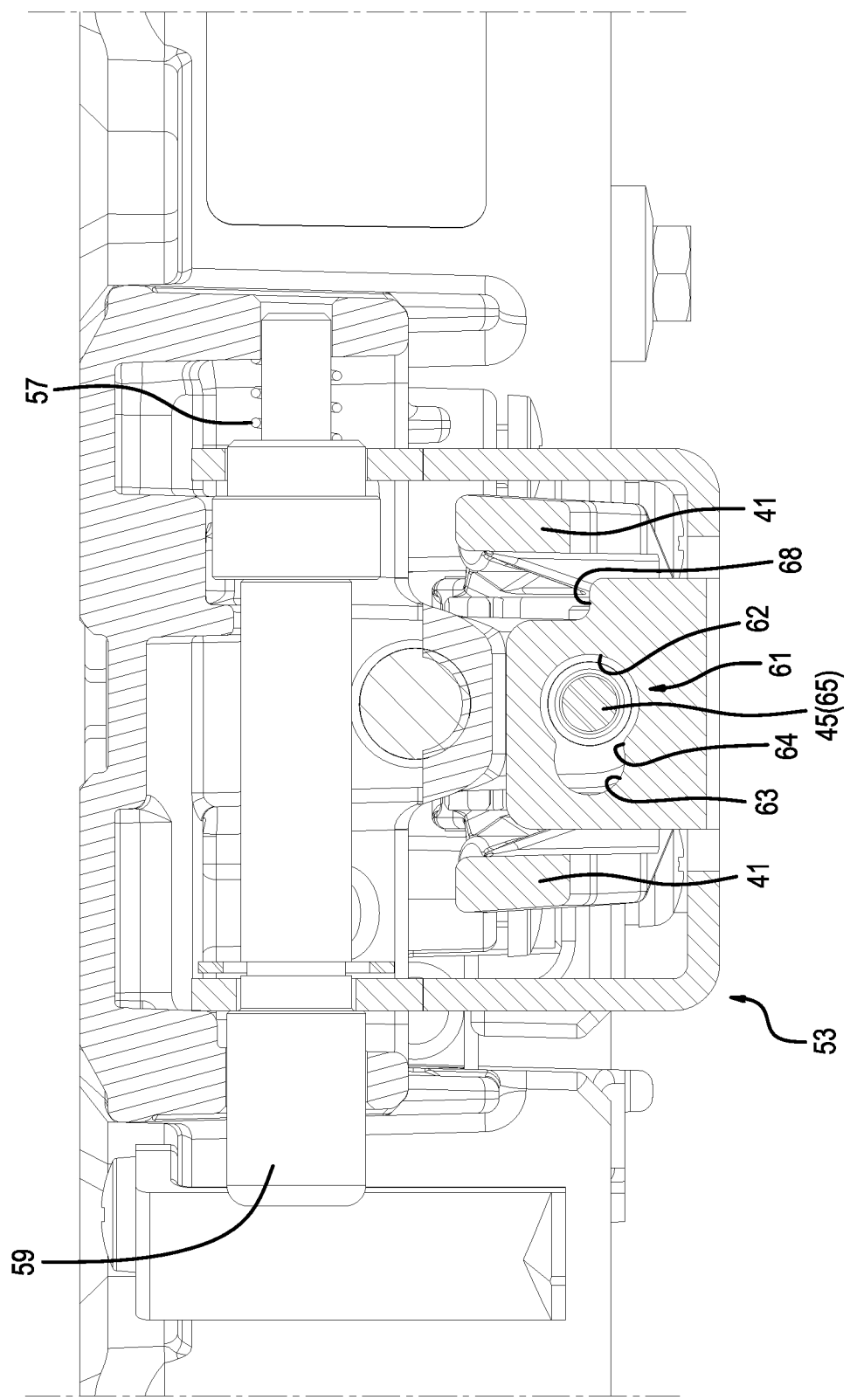
FIG. 16 is a cross-sectional view in which the second rotation-locking mechanism in FIG. 12 is cut along line XVI-XVI and viewed from the front side.
Figure 17:
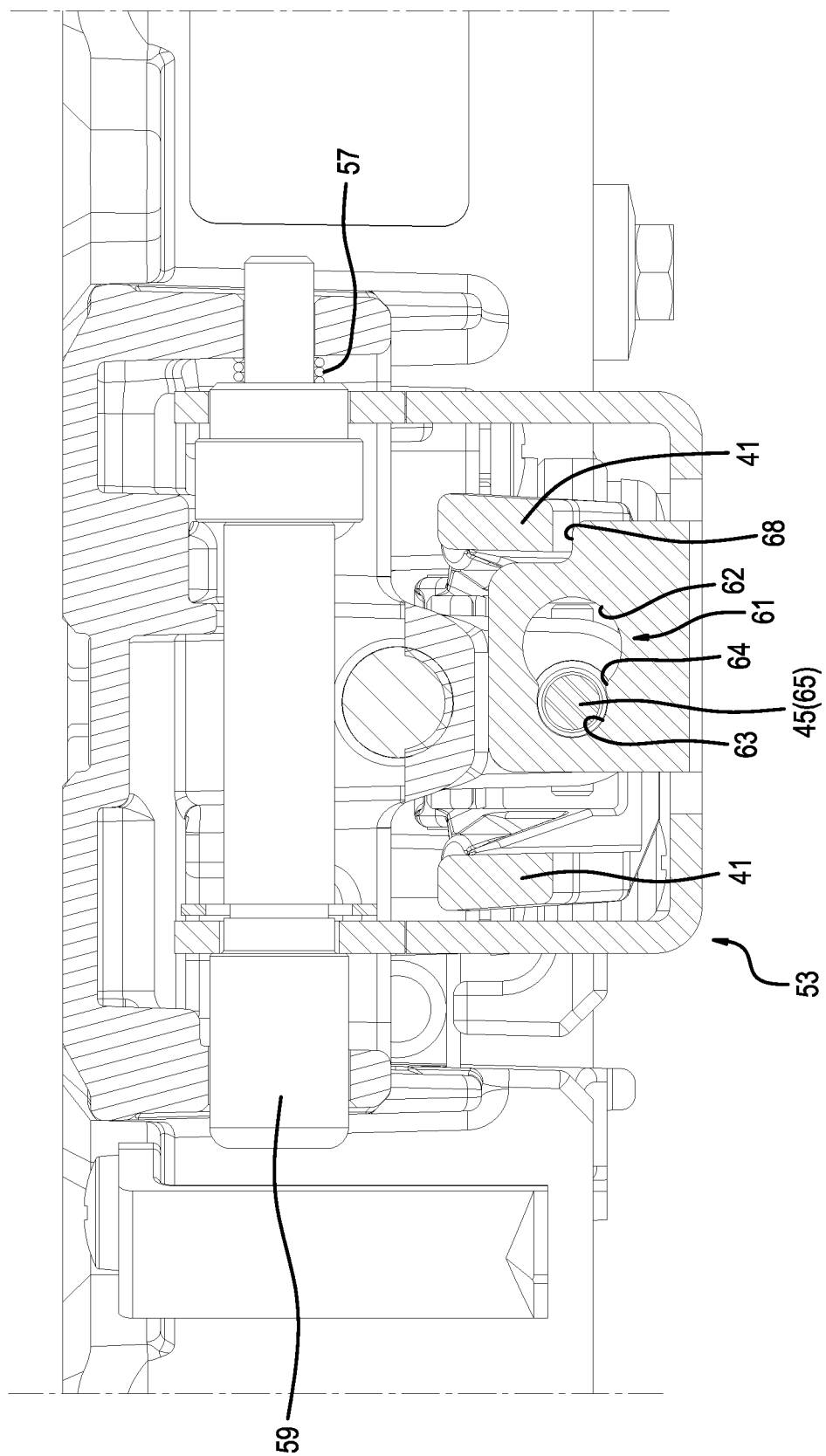
FIG. 17 is a cross-sectional view in which the second rotation-locking mechanism in FIG. 13 is cut along line XVII-XVII and viewed from the front side.
Figure 18:
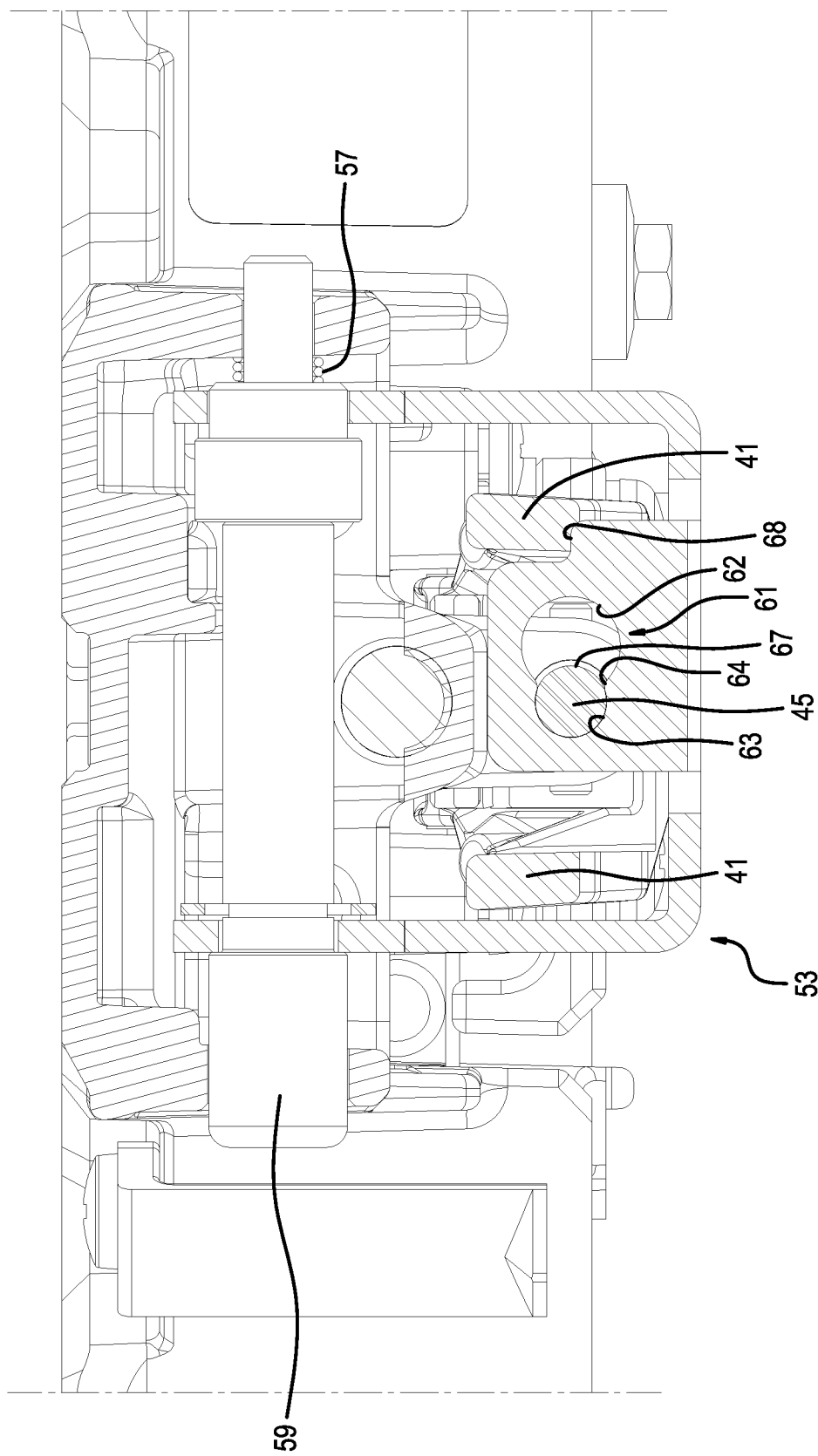
FIG. 18 is a cross-sectional view in which the second rotation-locking mechanism shown in FIG. 14 is cut along line XVIII-XVIII and viewed from the front side.

When the lock-release lever 41 is manually pulled up and thereby the locking pin 45 is pulled (axially shifted) to the near side (front side), the small-diameter portion 65 of the locking pin 45 moves into the middle of the large-circle portion 62 of the latching hole 61, as can be seen in FIGS. 12 and 16. As can be seen in FIG. 16, the passageway width of the constricted portion 64 of the latching hole 61 is larger than the diameter of the small-diameter portion 65 of the locking pin 45. Consequently, when the lock-release lever 41 is located at (pivoted to) its upper-limit position, the disengagement-holding member 53 can now be moved to the rightward latching position. In other words, if the user presses (pushes) the manipulatable button 59, the disengagement-holding member 53 will shift rightward (as seen in FIG. 16) because the constricted portion 64 does not block passage of the small-diameter portion 65 of the locking pin 45. Therefore, as a result of the rightward pushing of the manipulatable button 59, the small-diameter portion 65 of the locking pin 45 moves into the middle of the small-circle portion 63 of the latching hole 61, as can be seen in FIGS. 13 and 17. When the disengagement-holding member 53 is at the (rightward) latching position and the pull-up force of the lock-release lever 41 is released, the locking pin 45 is pushed rearward by the biasing force of the compression spring 58. Therefore, the tapered surface 67 of the locking pin 45 comes into contact with, and fits in, the small-circle portion 63 of the latching hole 61, as can be seen in FIGS. 14 and 18. Thus, owing to the tapered surface 67 being hooked or caught by the near-side edge of the small-circle portion 63, further rearward movement of the locking pin 45 is blocked. As a result, the locking pin 45 is held at the disengaged position at which the locking pin 45 is separated (spaced apart) from the recesses 51 (so that the turntable 3 can rotate (turn) relative to the base 3 without the locking pin 45 engaging in any of the recesses 51 of the engagement plate 50), even though the user is no longer pulling up the lock-release lever 41. Although the disengagement-holding member 53 is always biased leftward by the compression spring 57 (as viewed in FIGS. 15-18), because the passageway width of the constricted portion 64 of the latching hole 61 is smaller than the diameter of the small-circle portion 63, the tapered surface 67 does not slide out from the small-circle portion 63 to the large-circle portion 62.

When it is desired to greatly rotate the turntable 3 (in particular when the turntable 3 will be rotated (turned) relatively to the base 3 by an angular range that crosses one of the predetermined specific miter angles defined by the recesses 51), the locking pin 45 is first held at the disengagement position so that the turntable 3 will not be unintentionally stopped (locked) at one of predetermined angular positions (predetermined specific miter angles) during that rotation. To hold the locking pin 45 at the disengagement position, the user may continue to manually pull up of the lock-release lever 41 using a finger or the user may push the disengagement-holding member 53 rightward as was described above (and thus may discontinue pulling up (i.e. manually release) the lock-release lever 41). Even if the turntable 3 will be fixed at an arbitrary angular position (e.g., a position that differs from the predetermined angular positions corresponding to the recesses 51) by using the first rotation-locking mechanism 20 described above, the locking pin 45 can be held in advance at the disengagement position using the disengagement-holding member 53. Furthermore, because it is necessary to release the locking of the turntable 3 when using a fine-adjustment mechanism (manipulated by a fine-adjustment knob 123 shown in FIG. 1) that is separately provided to finely adjust the rotational angle of the turntable 3, it is convenient to perform the lock release holding by using the second rotation-locking mechanism 40.

Referring again to FIGS. 15-18, the standing part 60 of the disengagement-holding member 53 has a shoulder part (stop part) 68, which is on the right side and functions as a stopper. When the lock-release lever 41 is pulled up to the upper-limit position and the manipulatable button 59 is pushed, the disengagement-holding member 53 moves rightward, and the shoulder part 68 thereof moves underneath the vertically extending wall of the lock-release lever 41 that defines the right side of the circumvention hole 48, as can be seen in FIG. 17. When the pull-up force of the lock-release lever 41 is released, the lock-release lever 41 descends, but further descent is impeded by virtue of the contact of the lock-release lever 41 with the shoulder part 68 of the disengagement-holding member 53, as can be seen in FIG. 18. Thereby, the user can easily sense (by touch and/or sight) whether or not the rotation of the turntable 3 is locked by the second rotation-locking mechanism 40 from the position of the lock-release lever 41; i.e. if the lock-release lever 41 remains above its lower-limit position even though the user is not manually pulling up the lock-release lever 41, then the user knows the the second rotation-locking mechanism 40 will not block rotation of the turntable 3 relative to the base 3.

When the pull-up force of the lock-release lever 41 is released, the lock-release lever 41 is pressed downward (i.e. the manipulatable portion 43 pivots downward) by the biasing force of the compression spring 58 until rearward movement of the locking pin 45 is hindered (blocked) by the disengagement-holding member 53 (more specifically by the small-circle portion 62 of the latching hole 61), and the biasing force of the compression spring 58 no longer acts on the lock-release lever 41. However, at a certain point in time, because the descent of the lock-release lever 41 is hindered by the shoulder part 68 of the disengagement-holding member 53, up-down rattling of the lock-release lever 41 is reduced or eliminated when the second rotation-locking mechanism 40 is in the lock released state (when the turntable 3 is being rotated, etc.).

It is noted that the engaging pin 44, which extends transversely through the locking pin 45, serves two independent functions. First, the engaging pin 44 receives (contacts) the rearward end of the compression spring 58 to always transmit the biasing force of the compression spring 58 to the locking pin 45, regardless of whether the locking pin 45 is moving or not. Second, the transversely-extending engaging pin 44 interacts with the tilted surface 49 of the lever 41 to press the lever 41 downward when the locking pin 45 is moved rearward by the compression spring 58, and conversely to cause the locking pin 45 to move forward when the lever 41 is lifted by the user.

The transmission of the biasing force from the locking pin 45 to the lever 41 is effected by physically pushing the tilted surface 49, which inevitably requires movement of the locking pin 45. Therefore, when the rearward movement of the locking pin 45 is blocked by the disengagement-holding member 53, the lever 41 is no longer pressed downward by the engaging pin 44. The lever 41 will then slightly fall owing to gravity until the lever 41 rests on the stopper shoulder 68 of the disengagement-holding member 53.

The biasing force of the compression spring 58 provides pressure that keeps the tapered portion 67 of the locking pin 45 pressed against the small-diameter hole 62 when the lever 41 is no longer being manually lifted. This pressure engagement of the locking pin 45 with the hole 62 is accomplished before the lever can not go further down (i.e. because it has reached the stopper shoulder 68). Consequently, when the locking pin 45 is being blocked (stopped) by the disengagement-holding member 53, the biasing force of the compression spring 58 no longer acts on the lever 41.

When the lock-release lever 41 is once again pulled up to its upper-limit position and thus the locking pin 45 is being manual held at its disengagement position (in the lock released state), the locking pin 45 is pulled to the near side via the engaging pin 44. Thereby, the tapered surface 67 of the locking pin 45 separates from the front edge of the small-circle portion 63 of the latching hole 61. If the user is not pressing the manipulatable button 59, the disengagement-holding member 53 will return to the leftward disengagement position, owing to the biasing force of the compression spring 57. At this time, the small-diameter portion 65 of the locking pin 45 passes through the constricted portion 64 of the latching hole 61 and slides out to the large-circle portion 62. When the pull-up force on the lock-release lever 41 is released, the locking pin 45 is displaced rearward owing to the biasing force of the compression spring 58 and makes contact with the circumferential edge of the engagement plate 50 of the base 2 or one of the recesses 51 in the engagement plate 50.

When the user desires to fix the turntable 3 at one of the predetermined angular positions (specific miter angles) using the second rotation-locking mechanism 40, the holding of the locking pin 45 at the disengagement position is released by pulling up the lock-release lever 41 to its upper-limit position in this manner. When the turntable 3 is rotated, the rear-side tip of the locking pin 45 slides along the circumferential edge of the engagement plate 50 of the base 2 until one of the recesses 51 comes to be rearward of the locking pin 45. At that time, the locking pin 45 is displaced further rearward owing to the biasing force of the compression spring 58, and the tip of the locking pin 45 advances into that recess 51. Thereby, the turntable 3 is fixed at the stipulated angular position (miter angle) corresponding to that recess 51.

According to the embodiment explained above, the space above the locking pin 45 is effectively utilized as the location for disposing the pivot shaft 42 of the lock-release lever 41, and the structure above the screw shaft 22 of the manipulatable member 21 can be simplified because it comprises substantially only the slide shaft 54 of the disengagement-holding member 53. Consequently, this design permits the manipulatable knob 23 to be disposed more upwardly (closer to the table surface 4) than known designs, and enables the lock mechanism to be made more compact in the up-down direction.

Sliding Forward and Rearward and Pivoting Upward and Downward of the Cutting Tool As shown in FIGS. 1 to 5, the cutting-machine main body 100 is supported by two slide bars 110 such that it is capable of sliding forward and rearward relative to the turntable 3. A support arm 70, which extends upward, is mounted on a rear portion of the turntable 3. The two slide bars 110 extend forward from the upper portion of the support arm 70 and are parallel to one another, spaced apart by a gap in the up-down direction. The tips of the two slide bars 110 lead to a location above the center of the turntable 3, where they are joined by a coupling member 111. A slider 112 is mounted along the two slide bars 110 such that the slider 112 is capable of sliding in the front-rear direction along the slide bars 110, and the cutting-machine main body 100 is supported by the slider 112. Therefore, the cutting-machine main body 100 and the cutting tool 102 are capable of sliding forward and rearward via the slider 112 and the slide bars 110. In addition, a rear portion of the cutting-machine main body 100 is supported, via a pivot-motion support shaft 113, by a support part of a lower portion of the slider 112 such that the cutting-machine main body 100 is capable of pivoting up and down relative to the turntable 3. The cutting-machine main body 100 is biased toward the upward standby position by a torsion spring mounted around the pivot-motion support shaft 113.

Tilt-Lock Mechanism (Bevel Angle Setting Mechanism)

Figure 19:
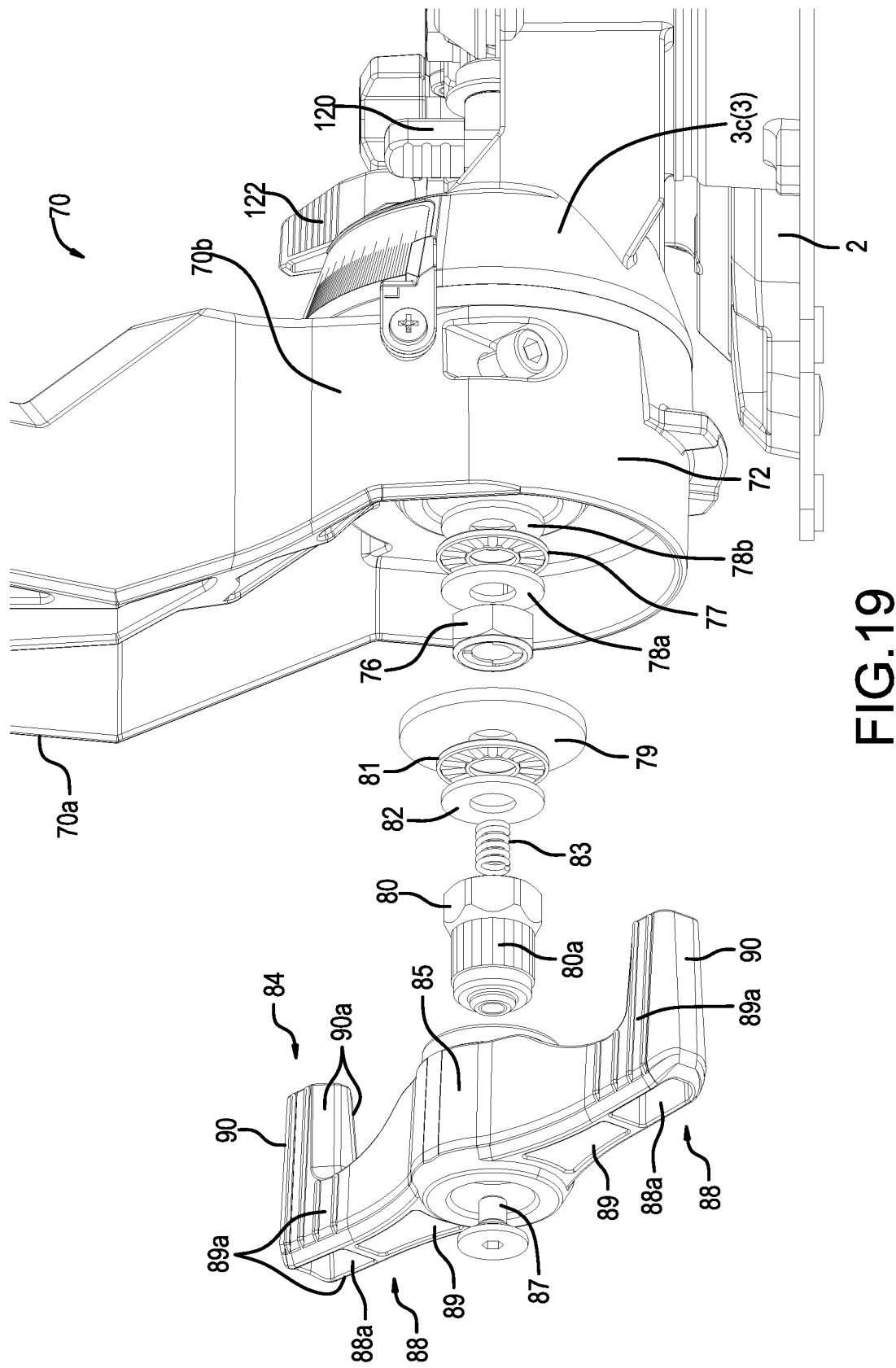
FIG. 19 is an exploded oblique view of a tilt-lock mechanism, which is provided on a support arm of the benchtop cutting machine.
Figure 20:
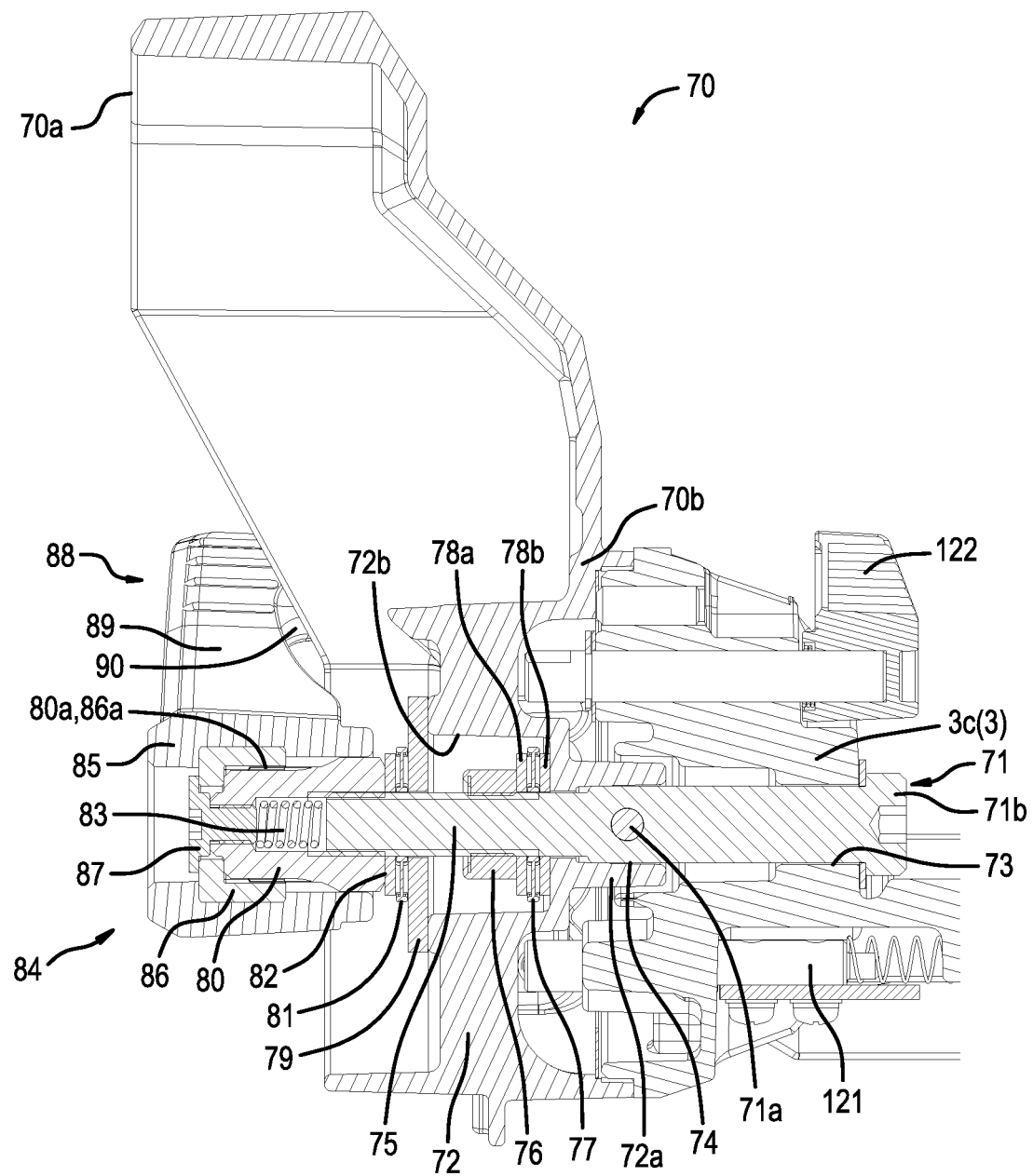
FIG. 20 is a cross-sectional view of the tilt-lock mechanism cut along line XX-XX in FIG. 5.

As shown in FIGS. 19 and 20, the support arm 70 is supported by the turntable 3 via a tilt shaft 71 such that it is capable of tilting in the left-right (clockwise-counterclockwise) direction. An arm-support part 3*c* is integrally provided on the rear side of the circular part 3*a* (FIG. 1) of the turntable 3. The outer circumference of the rear side of the arm-support part 3*c* has a mating surface, which has a circular-columnar shape, and the inner circumference of the front side of a base-end part 72 of the support arm 70 has a corresponding mating surface, which has a complimentary circular-columnar shape. The support arm 70 is rotatably supported at the base-end part 72 by the arm-support part 3*c* via the tilt shaft 71. Thereby, the cutting-machine main body 100 is tiltable leftward (counterclockwise) and rightward (clockwise) about the longitudinal axis of the tilt shaft 71. The location of the longitudinal axis of the tilt shaft 71 in the up-down direction coincides with the location (plane) of the top-plate surface 4*b* (FIG. 1) of the turntable 3. Through holes 73, 74 are formed in the arm-support part 3*c* and the base-end part 72 of the support arm 70, respectively. The tilt shaft 71 is passed (extends) through the through holes 73, 74 from the front side of the arm-support part 3*c*.

A rear portion of the tilt shaft 71 has a screw-shaft portion (threaded shaft end) 75, which protrudes rearward from the base-end part 72 of the support arm 70. A mounting nut 76 is tightened (screwed) on the screw-shaft portion 75. A recess 72*b* is formed on (in) the rear side of the base-end part 72. When the mounting nut 76 is tightened on the screw-shaft portion 75, the mounting nut 76 is located at a base (frontward-most surface) of the recess 72*b*. A notch (not shown) is provided on a circumferential wall 72*a*, which forms the through hole 74 of the support arm 70. When a rotation-locking pin 71*a* is passed through the tilt shaft 71 and the protruding portion of the rotation-locking pin 71*a* is disposed in the middle of the notch of the through hole 74, rotation of the tilt shaft 71 is restrained (blocked) when the mounting nut 76 is tightened on the screw-shaft portion 75. Accordingly, although the tilt shaft 71 is nonrotatable relative to the through hole 74 of the support arm 70, the tilt shaft 71 is rotatable relative to the through hole 73 of the arm-support part 3*c*. When the mounting nut 76 is tightened, the arm-support part 3*c* and the support arm 70 are fastened to one another between a head part 71*b* of the tilt shaft 71 and the mounting nut 76. While the support arm 70 is being pressed against the arm-support part 3*c* in the axial direction by an appropriate axial force produced by this fastening, the support arm 70 is supported such that it is tiltable relative to the arm-support part 3*c*. On the other hand, because the tilt shaft 71 is rotatable relative to the through hole 73 of the arm-support part 3*c*, if a force is applied to the support arm 70 in the left-right direction, then the support arm 70 rotates, together with the tilt shaft 71, the mounting nut 76, etc., about its axis relative to the arm-support part 3*c*. By using a hex nut as the mounting nut 76, it becomes possible for the user, at the site at which the benchtop cutting machine 1 is being used, to disassemble and repair the benchtop cutting machine 1 using commonly-available tools such as a socket wrench. A thrust bearing 77 and washers 78*a*, 78*b* for stabilizing the axial force are interposed between the mounting nut 76 and the base surface of the recess 72*b* of the base-end part 72.

The cutting-machine main body 100 can be fixed at an arbitrary angular (bevel) position (e.g., a right-angle cutting position, a tilted position, or the like) using the tilt-lock mechanism. A pedestal member 79, which has a shaft hole, is mounted on the screw-shaft portion 75 and is disposed such that it closes up the recess 72*b* of the base-end part 72. A tilt-fixing nut 80 is screwed onto the screw-shaft portion 75. When the tilt-fixing nut 80 is tightened, the arm-support part 3*c* and (the pedestal member 79 of) the support arm 70 are fastened (clamped) to one another between the head part 71*b* of the tilt shaft 71 and the tilt-fixing nut 80. Owing to this axial clamping force, the tilting of the support arm 70 relative to the arm-support part 3*c* is locked. A thrust bearing 81 and a washer 82 for stabilizing the axial clamping force are interposed between the tilt-fixing nut 80 and the rear surface of the pedestal member 79. When the tightening of the tilt-fixing nut 80 is loosened, the support arm 70 once again becomes tiltable relative to the arm-support part 3*c*.

An inner-circumferential surface of the tilt-fixing nut 80 is stepped, and a compression spring 83 is held between a tip of the tilt shaft 71 and a stepped surface of the tilt-fixing nut 80. Because the screw threads between the tilt-fixing nut 80 and the screw shaft 75 of the tilt shaft 71 are filled by the compression spring 83, rattling of the tilt-fixing nut 80 in the axial direction is reduced. In addition, when the support arm 70 is tilted, the tilt-fixing nut 80 rotates, owing to the friction of the screw thread produced by the compression spring 83, such that it follows the tilt shaft 71. Therefore, even if the support arm 70 were to be tilted suddenly, the problem in which the tightening force adversely changes due to the tilt shaft 71 rotating relative to the tilt-fixing nut 80 tends not to occur.

Tilt-Fixing Lever (Bevel Angle Adjustment Lever)

A tilt-fixing lever 84, which is designed for the user to manipulate (manually move), is mounted on the tilt-fixing nut 80. With regard to the support arm 70, a lower part 70*b*, which includes the base-end part 72, is offset forward relative to an upper part 70*a*. The tilt-fixing lever 84 is disposed on the rear side of the lower part 70*b*, and the overall size of the tilt-fixing lever 84 is set such that it fits forward of the rear surface of the upper part 70*a*. Thereby, because the space forward and rearward of the support arm 70 can be utilized effectively, there is no need to increase the size of the cutting machine in the rearward direction. With regard to the tilt-fixing lever 84, a metallic ring-shaped member 86 is fixed by insert molding in an inner-circumferential surface of a hole formed in a mounting part 85, which is at the center of the tilt-fixing lever 84. A male type spline 80*a* is formed on an outer-circumferential surface of the tilt-fixing nut 80 along the direction of the rotational axis of the tilt-fixing nut 80, and a corresponding female type spline 86*a* is formed on (in) the ring-shaped member 86 in an inner portion of the tilt-fixing lever 84. The tilt-fixing lever 84 is mounted on the tilt-fixing nut 80 such that the splines 80*a*, 86*a* intermesh. It is preferable that the splines 80*a*, 86*a* are involute splines. In this case, the transmission of torque between the tilt-fixing lever 84 and the tilt-fixing nut 80 as well as the durability of the splines 80*a*, 86*a* are improved. The tilt-fixing lever 84 is fixed to the tilt-fixing nut 80 using a mounting screw 87. When the mounting screw 87 is tightened onto (into) the tip surface of the tilt-fixing nut 80, the ring-shaped member 86 is sandwiched between the mounting screw 87 and the tilt-fixing nut 80, and the tilt-fixing lever 84 is fixed to the tilt-fixing nut 80.

The tilt-fixing lever 84 comprises two lever arms 88, which are disposed at diametrically-opposite ends of the rotational axis. Each lever arm 88 comprises a radially extending part 89, which extends outward in the radial direction from the mounting part 85 at the center, and a forward-extending part 90, which extends forward from the radially extending part 89. The forward-extending part 90 of each lever arm 88 extends forward from the rear surface of the lower part 70b of the support arm 70. Therefore, even when the user is standing on the front side of the benchtop cutting machine 1, the user can still easily access the tilt-fixing lever 84 located on the rear side of the cutting machine 100, and thereby ease of operation is excellent. The forward-extending part 90 of each lever arm 88 is generally a quadrilateral in cross section, and a portion of the forward-extending part 90 inward in the radial direction has two inclined surfaces 90a, thereby reducing the inward thickness of the forward-extending part 90. Consequently, interference of the lever arms 88 with a side surface of the support arm 70 can be avoided as much as possible, thereby increasing the angular range over which the tilt-fixing lever 84 can rotate. With regard to the radially extending part 89 of each lever arm 88, both side surfaces 89a of a tip portion are parallel to one another. Thereby, when the user rotates the tilt-fixing lever 84, his or her finger tends not to slide over the side surfaces 89a, and thereby a rotational force (torque) can be imparted efficiently to the lever arms 88. Each lever arm 88 has a lightening part (hollow portion) 88a, which is recessed and passes from a rear surface of the corresponding radially extending part 89 to an inner portion of the corresponding forward-extending part 90. Thereby, ductility can be ensured in case the tilt-fixing lever 84 is formed by injection molding of a polymer (resin), while minimizing any decrease in the strength of the tip portion of the forward-extending part 90.

If the user removes the mounting screw 87, the mounting angle (orientation of the lever arms 88) of the tilt-fixing lever 84 relative to the tilt-fixing nut 80 can be changed. By setting the pitch of the splines 80a, 86a to, for example, 10°, the relative mounting angle of the tilt-fixing lever 84 can be adjusted in 10° steps. By setting, to less than a half rotation, the amount of rotation of the tilt-fixing lever 84 needed to fix and release the fixing of the tilt of the support arm 70, it becomes possible to fix and release the fixing of the lever arms 88 to a range such that the lever arms 88 do not contact the support arm 70. It is possible that the tightening of the internal mechanism may loosen over the course of time, i.e. with extended use. In this case, the rotational range of the tilt-fixing lever 84 will change, and thereby the lever arms 88 might be caught by the side surface of the support arm 70 such that the required amount of rotation can no longer be obtained. In such a situation, too, the user can, by adjusting the relative mounting angle of the tilt-fixing lever 84, change the rotational range of the tilt-fixing lever 84 to a range such that the tilt-fixing lever 84 does not contact the support arm 70.

Figure 21:
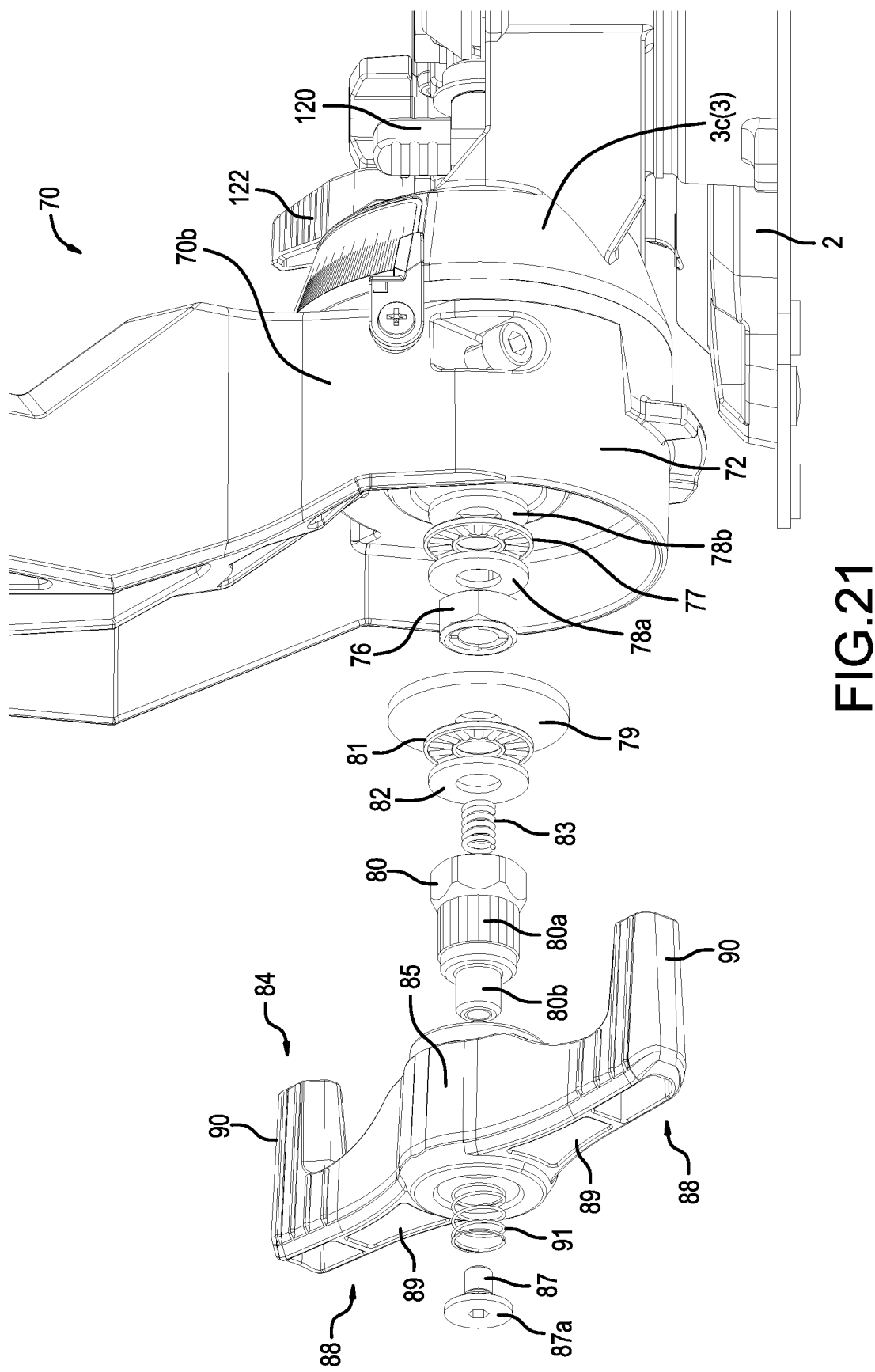
FIG. 21 is an exploded oblique view of the tilt-lock mechanism according to another exemplary embodiment of a benchtop cutting machine according to the present teachings.
Figure 22:
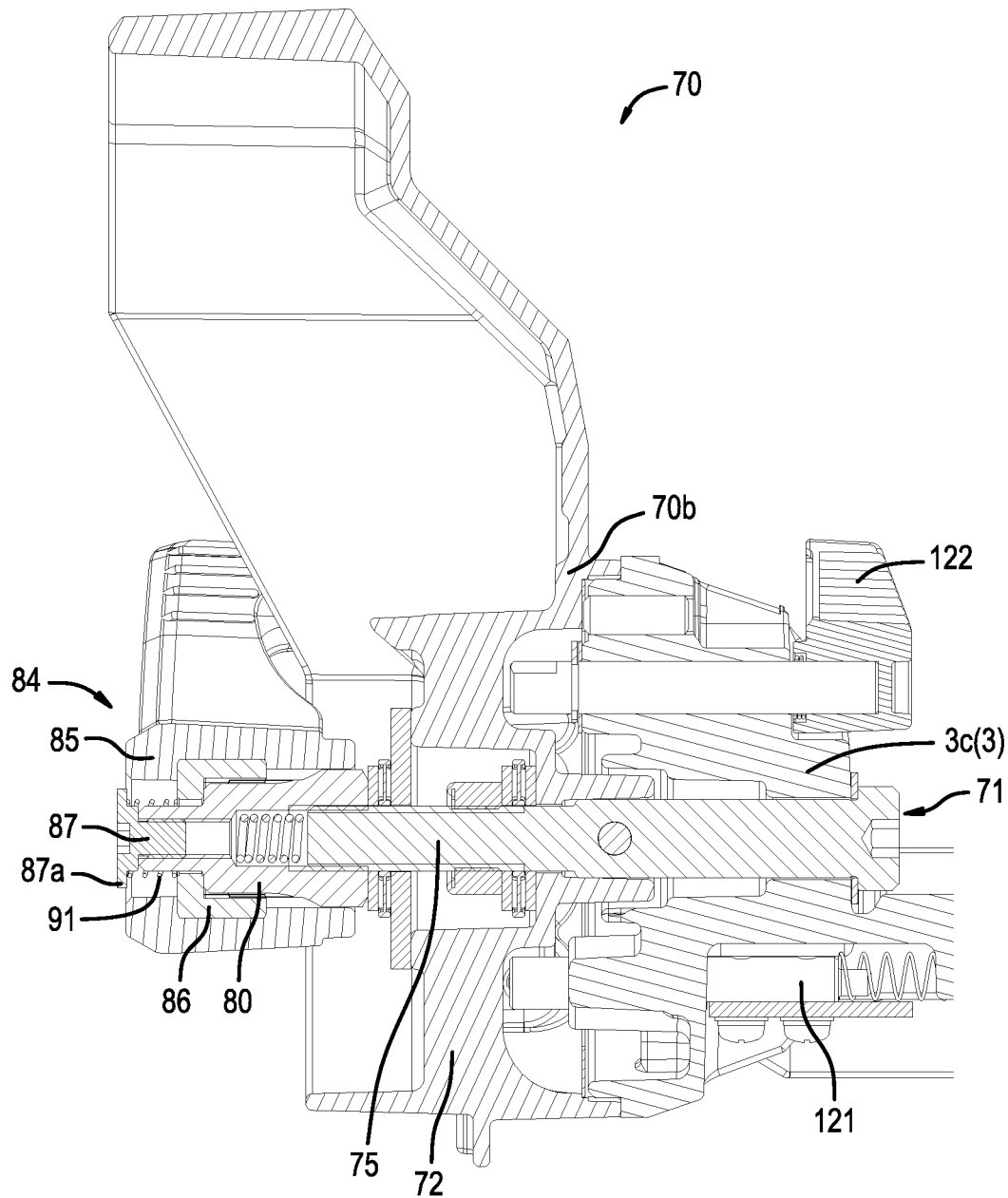
FIG. 22 is a cross-sectional view of the tilt-lock mechanism of FIG. 21, in which the manipulatable lever is at an engaged position, which is forward.
Figure 23:
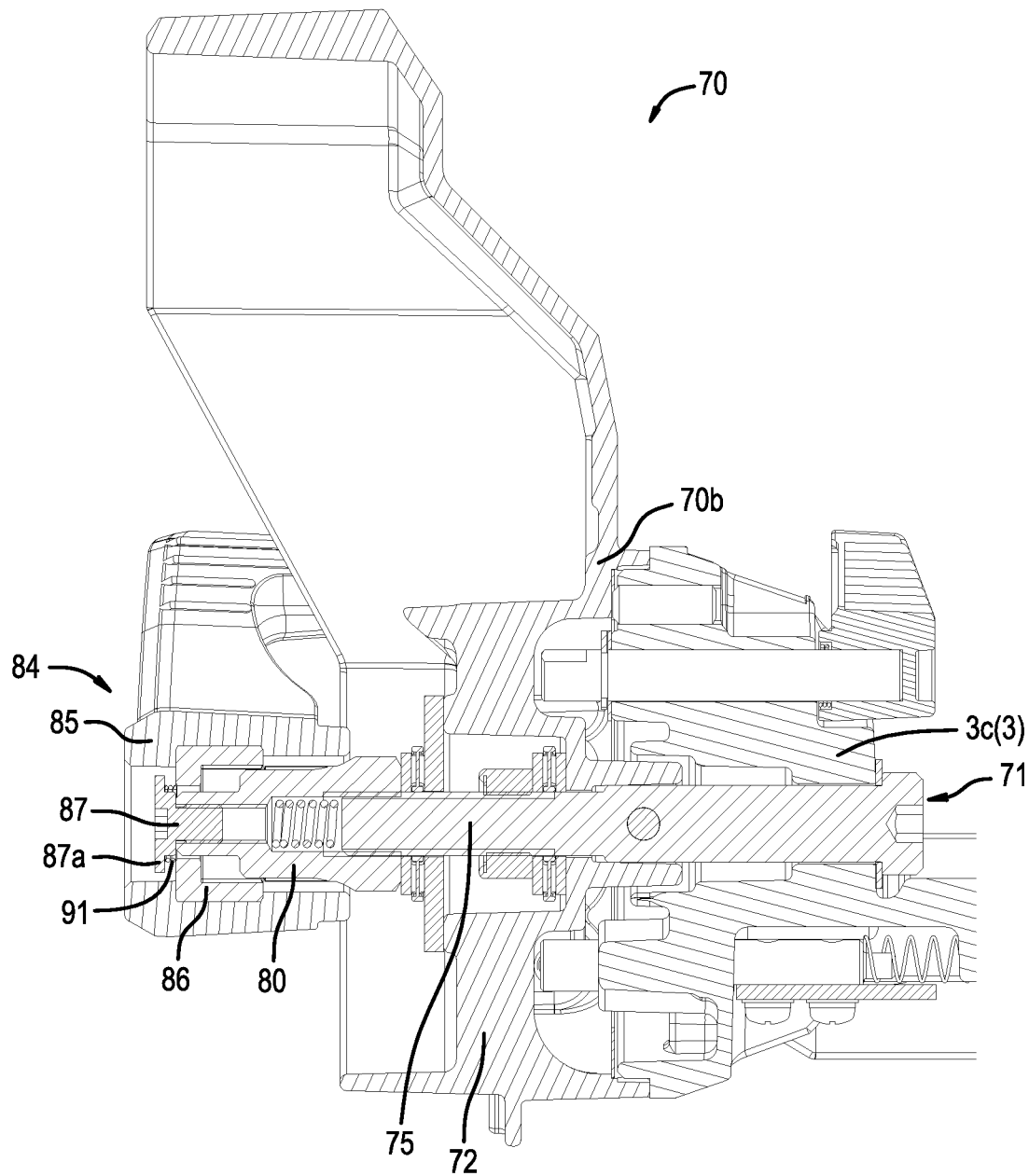
FIG. 23 is a cross-sectional view of the tilt-lock mechanism of FIG. 21, in which the manipulatable lever is pulled to a disengagement position, which is rearward.

FIGS. 21 to 23 show the tilt-lock mechanism according to a second embodiment. In this second embodiment as well, the tilt-fixing lever 84 is mounted on the tilt-fixing nut 80 by the mounting screw 87. However, in the second embodiment, a tip portion 80b of the tilt-fixing nut 80 is extended, and a hole in the mounting part 85 of the tilt-fixing lever 84 can slide in the axial direction along the tip portion 80b. In addition, the mounting screw 87 comprises a stop part 87a, which has a flange shape. The tilt-fixing lever 84 is biased frontward by a compression spring 91. The compression spring 91 is mounted on the tip portion 80b of the tilt-fixing nut 80 and held between the ring-shaped member 86 in an inner portion of the tilt-fixing lever 84 and a stop part of the mounting screw 87. When the tilt-fixing lever 84 is pulled out and the compression spring 91 is compressed to its limit, further pulling out of the tilt-fixing lever 84 is restrained (blocked). When the tilt-fixing lever 84 is pulled out to the disengagement position, the spline 86a (FIG. 20) of the tilt-fixing lever 84 comes off of the spline 80a of the tilt-fixing nut 80, and the tilt-fixing lever 84 becomes rotatable about its axis. Thereby, even if the user does not remove the mounting screw 87 or does not completely remove the tilt-fixing lever 84 from the tilt-fixing nut 80, the user can still change the mounting angle of the tilt-fixing lever 84 relative to the tilt-fixing nut 80. When the splines 80a, 86a (FIG. 20) are engaged and the pull-out force of the tilt-fixing lever 84 is released, the tilt-fixing lever 84 is held at an engaged position by the biasing force of the compression spring 91.

Right-Tilt Changing Lever

When the tilt-fixing lever 84 described above is loosened, the fixing of the tilt (bevel angle) of the cutting-machine main body 100 is released, and it becomes possible to freely tilt the support arm 70 between a right-angle position and a 45°-counterclockwise position. Specifically, as shown in FIGS. 19 and 20, a right-angle stopper 121, a 45°-counterclockwise stopper, and a 45°-clockwise stopper are provided in an inner portion of the support arm 70. A protruding part (not shown), which extends rearward, is provided on the arm-support part 3c of the turntable 3. When the support arm 70 is tilted between the right-angle position and the 45°-counterclockwise position, this protruding part moves between the right-angle stopper 121 and the 45°-counterclockwise stopper. A right-tilt changing lever 120 is mounted, such that it is slidable in the front-rear direction, between a set position and a releasing position. The right-tilt changing lever 120 is disposed slightly to the left of a rear-portion upper surface of the turntable 3. The right-tilt changing lever 120 is biased toward the rearward set-position side by a compression spring. The right-angle stopper 121 is interlocked with (operably coupled to) the right-tilt changing lever 120. When the right-tilt changing lever 120 is pulled frontward, the right-angle stopper 121 moves toward a retracted (retreated) position, which is on the near side, and the protruding part does not make contact with the right-angle stopper 121, even if the support arm 70 tilts. When it is desired to tilt the cutting-machine main body 100 rightward of the right-angle position, the right-angle stopper 121 is moved to the retracted (retreated) position by pulling the right-tilt changing lever 120 to the releasing position. Thereby, the protruding part of the arm-support part 3c can freely move between the 45°-counterclockwise stopper and the 45°-clockwise stopper, and the tilt angle of the cutting-machine main body 100 can be adjusted within the range from the 45°-counterclockwise position to the 45°-clockwise position. It is noted that, when the cutting-machine main body 100 is rightward of the right-angle position, the right-tilt changing lever 120 releases; and when the cutting-machine main body 100 is tilted, even a little bit, leftward from the right-angle position, the right-tilt changing lever 120 moves rearward, and the right-angle stopper 121 automatically returns to the original restrained position. After the cutting-machine main body 100 has been tilted to the desired angle, when the tilt-fixing lever 84 is tightened, the tilt (bevel angle) of the cutting-machine main body 100 is fixed.

Tilt-Stopper Changing Lever

By manipulating a tilt-stopper changing lever 122, the limit bevel angle (in the explanation above, 45°) of the tilt can be switched to a prescribed angle that is a larger angle (e.g., 46°). The tilt-stopper changing lever 122 is disposed on an upper portion of the front surface of the arm-support part 3c. The tilt-stopper changing lever 122 is mounted so as to be rotatable between the set position and the releasing position, in which the front-rear direction serves as the rotational axis, and is biased in a releasing direction (clockwise when viewed from the front) by a torsion spring. When the tilt-stopper changing lever 122 is rotated counterclockwise, the 45°-counterclockwise stopper and the 45°-clockwise stopper can be moved to the retracted (retreated) position simultaneously. Furthermore, when the protruding part of the support arm 70 passes by the 45°-counterclockwise position, the protruding part makes contact with a 46°-counterclockwise stopper. After being tilted leftward of the 45°-counterclockwise position, when the tilt-stopper changing lever 122 is released and the cutting-machine main body 100 is tilted rightward, even slightly, from the 45°-counterclockwise position, the tilt-stopper changing lever 122 automatically rotates clockwise, and the 45°-counterclockwise stopper returns to its original position. Likewise, when the protruding part of the support arm 70 passes by the 45°-clockwise position, the protruding part makes contact with a 46°-clockwise stopper. After being tilted rightward of the 45°-clockwise position, when the tilt-stopper changing lever 122 is released and the cutting-machine main body 100 is tilted leftward, even slightly, from the 45°-clockwise position, the tilt-stopper changing lever 122 automatically rotates clockwise, and the 45°-clockwise stopper returns to its original position.

In the above embodiments, exemplary examples of sliding compound miter saws that are capable of cutting by both sliding the cutting-machine main body forward and rearward and by pivoting the cutting-machine main body upward and downward were explained. However, as an additional embodiment of the present teachings, the same features are applicable even to a benchtop miter saw in which a forward-rearward sliding mechanism is not installed such that cutting is performed by only pivoting the cutting tool upward and downward. More specifically, although dual-bevel slide compound miter saws were described above in detail, the present teachings are generally applicable to any type of miter saw, such as compound miter saws, dual-bevel compound miter saws, sliding compound miter saws, etc.

In the above, although examples of the present teachings were explained using specific embodiments, the present invention is not limited to these embodiments, and it is understood that various substitutions, improvements, and modifications can be effected by a person skilled in the art without departing from the object and/or gist of the present invention.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved benchtop cutting machines, such as miter saws.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Benchtop cutting machine (sliding compound miter saw)
2 Base
3 Turntable
3a Circular part
3b Forward-protruding part
3c Arm-support part
4 Table surface
4a Top-plate surface
4b Top-plate surface
5 Rotary spindle
6 Fence
7 Kerf board
8 Concave surface
8a Front-end part
8b Bottom part
9 Angle scale
10 Indicator-needle part
20 First rotation-locking mechanism
21 Manipulatable portion
22 Screw shaft
23 Manipulatable knob
24 Front-side support body
25 Screw hole
26 Transmission plate
27, 28 Fixing screws
29 Transmission rod
30 Rear-side support body
31 Rod-receiving part
32 Rod-receiving member
33 Turn stopper
34 Support shaft
35 Upward arm
36 Forward arm
37 Slide plate
38 Rib
40 Second rotation-locking mechanism (lock mechanism)
41 Lock-release lever (manipulatable lever)
42 Pivot shaft (pivot center or center of rotation)
43 Manipulatable portion (manually movable portion)
44 Engaging pin
45 Locking pin
46, 47 Support holes
48 Circumvention hole
49 Tilted surface
50 Engagement plate
51 Recess
52 Sloped surface
53 Disengagement-holding member
54 Slide shaft
55 Plate (suspended part)
56 Support hole
57 Compression spring
58 Compression spring
59 Manipulatable button
60 Standing part (latching part)

61 Latching hole
62 Large-circle portion
63 Small-circle portion
64 Constricted portion
65 Small-diameter portion
66 Large-diameter portion
67 Tapered surface
68 Shoulder part (stop part)
69 Support arm
70a Upper part
70b Lower part
71 Tilt shaft
71a Rotation-locking pin
71b Head part
72 Base-end part
72a Circumferential wall
72b Recess
73, 74 Through holes
75 Screw shaft
76 Mounting nut
77 Thrust bearing
78a, 78b Washers
79 Pedestal member
80 Tilt-fixing nut
80a Spline
80b Tip portion
81 Thrust bearing
82 Washer
83 Compression spring
84 Tilt-fixing lever
85 Mounting part
86 Ring-shaped member
86a Spline
87 Mounting screw
87a Stop part
88 Lever arm
88a Lightening part
89 Radially extending part
89a Side surface
90 Forward-extending part
90a Inclined surface
100 Cutting-machine main body
101 Electric motor
102 Cutting tool (miter saw blade)
103 Fixed cover
104 Movable cover
105 Spindle
110 Slide bar
111 Coupling member
112 Slider
113 Pivot-motion support shaft
120 Right-tilt changing lever
121 Right-angle stopper
122 Tilt-stopper changing lever
123 Fine-adjustment knob
150 Main handle
152 Switch lever
154 Carrying handle

We claim:

1. A miter saw comprising:
a base;
a turntable configured to be rotatable relative to the base; and
a lock mechanism configured to lock rotation of the turntable relative to the base, the lock mechanism including:
a locking pin that is movable along an axial direction of the locking pin relative to the turntable and configured to lock the rotation of the turntable by engaging with the base,
a manipulatable lever configured to be pivotable in an up-down direction to release engagement of the locking pin with the base, the up-down direction being perpendicular to the axial direction of the locking pin, and
a disengagement-holding member configured to hold the locking pin in a disengaged state from the base,
wherein:
the manipulatable lever is pivotable about a pivot point that is located above the locking pin in the up-down direction,
the disengagement-holding member includes a latching part and is movable between a latching position and a releasing position,
the latching part is configured such that, when the locking pin is held at a disengaged position by the manipulatable lever and the disengagement-holding member is moved to the latching position, the latching part latches the locking pin and thereby restricts movement of the locking pin such that the locking pin is held in the disengaged state, and
the disengagement-holding member is movable between the latching position and the releasing position in a lateral direction that is perpendicular to the axial direction of the locking pin and perpendicular to the up-down direction.

2. The miter saw according to claim 1, further comprising:
a manipulatable knob configured to be grasp by a user to rotate the turntable relative to the base, and
a support shaft that rotatably supports the manipulatable knob;
wherein:
the disengagement-holding member comprises a slide shaft that is disposed above the support shaft in the up-down direction and extends in the lateral direction;
the slide shaft is supported by the turntable such that the slide shaft is axially slidable in the lateral direction; and
the disengagement-holding member is configured such that sliding of the slide shaft relative to the turntable causes the disengagement-holding member to move between the latching position and the releasing position and vice versa.

3. The miter saw according to claim 2, wherein the manipulatable lever comprises a manually movable portion that is disposed downward of the manipulatable knob in the up-down direction.

4. The miter saw according to claim 3, further comprising:
a support body provided on a lower surface of the turntable and supporting the support shaft;
wherein, as viewed along the axial direction of the locking pin, the slide shaft is disposed between a front end of the turntable and the support body.

5. The miter saw according to claim 4, wherein:
a manipulatable button is provided integrally on the slide shaft; and
the disengagement-holding member is configured to be slid in the lateral direction by manually pushing the manipulatable button.

6. The miter saw according to claim 5, wherein the disengagement-holding member further includes a stop part configured such that:

when the disengagement-holding member is disposed in the latching position, descent of the manipulatable lever is blocked by the stop part; and when the disengagement-holding member is disposed in the releasing position, descent of the manipulatable lever is not blocked by the stop part.

7. The miter saw according to claim 6, wherein:
the disengagement-holding member further includes a U shape suspended part that surrounds a portion of the manipulatable lever; and
the latching part is disposed on the suspended part.

8. The miter saw according to claim 7, wherein:
the base comprises an engagement plate having at least one recess;
a tip portion of the locking pin includes a terminal end surface and a circular-columnar-shaped side surface adjacent thereto;
at least one flat chamfered surface extends from the terminal end surface to the circular-shaped side surface; and
engagement of the at least one flat chamfered surface of the locking pin with the at least one recess of the engagement plate blocks rotation of the turntable relative to the base.

9. The miter saw according to claim 8, wherein:
the latching part of the disengagement-holding member has a latching hole that includes a large-hole portion and a small-hole portion;
the locking pin has a small-diameter portion, a large-diameter portion, and a tapered portion between the small-diameter portion and the large-diameter portion;
the latching part is configured such that, when the locking pin is held at the disengaged position and the disengagement-holding member is moved to the latching position, the tapered portion fits into the small-hole portion of the disengagement-holding member and holds the disengagement-holding member at the latching position such that the locking pin is also held in the disengaged state;
the locking pin is biased toward a locked position with the turntable by a first spring;
the manipulatable lever is configured such that upward pivoting movement of the manipulatable lever causes the locking pin to move to the disengaged position against the bias of the first spring, and to move the small-diameter portion into the latching hole;
when the disengagement-holding member is disposed in the latching position, the first spring presses the tapered portion against the small-hole portion of the latching hole to hold the tapered portion in the small-hole portion;
the disengagement-holding member is biased toward the releasing position by a second spring; and
when the manipulatable lever is moved upward while the locking pin is held in the disengaged state from the base, the tapered portion is released from the small-hole portion, and the second spring causes the disengagement-holding member to return to the releasing position.

10. The miter saw according to claim 2, further comprising:
a support body provided on a lower surface of the turntable and supporting the support shaft;
wherein, as viewed along the axial direction of the locking pin, the slide shaft is disposed between a front end of the turntable and the support body.

11. The miter saw according to claim 2, wherein:
a manipulatable button is provided integrally on the slide shaft; and
the disengagement-holding member is configured to be slid in the lateral direction by manually pushing the manipulatable button.

12. A miter saw comprising:
a base;
a turntable configured to be rotatable relative to the base; and
a lock mechanism configured to lock rotation of the turntable relative to the base, the lock mechanism including:
a locking pin that is movable along an axial direction of the locking pin relative to the turntable and configured to lock the rotation of the turntable by engaging with the base,
a manipulatable lever configured to be pivotable in an up-down direction to release engagement of the locking pin with the base, the up-down direction being perpendicular to the axial direction of the locking pin, and
a disengagement-holding member configured to hold the locking pin in a disengaged state from the base,
wherein:
the manipulatable lever is pivotable about a pivot point that is located above the locking pin in the up-down direction,
the disengagement-holding member includes a latching part and is movable between a latching position and a releasing position,
the latching part is configured such that, when the locking pin is held at a disengaged position by the manipulatable lever and the disengagement-holding member is moved to the latching position, the latching part latches the locking pin and thereby restricts movement of the locking pin such that the locking pin is held in the disengaged state, and
the disengagement-holding member includes a stop part configured such that:
when the disengagement-holding member is disposed in the latching position, descent of the manipulatable lever is blocked by the stop part; and
when the disengagement-holding member is disposed in the releasing position, descent of the manipulatable lever is not blocked by the stop part.

13. The miter saw according to claim 12 wherein:
the latching part of the disengagement-holding member has a latching hole that includes a large-hole portion and a small-hole portion;
the locking pin has a small-diameter portion, a large-diameter portion, and a tapered portion between the small-diameter portion and the large-diameter portion; and
the latching part is configured such that, when the locking pin is held at the disengaged position and the disengagement-holding member is moved to the latching position, the tapered portion fits into the small-hole portion of the disengagement-holding member and holds the disengagement-holding member at the latching position such that the locking pin is also held in the disengaged state.

14. The miter saw according to claim 12, wherein:
the base comprises an engagement plate having at least one recess;
a tip portion of the locking pin includes a terminal end surface and a circular-columnar-shaped side surface adjacent thereto;

at least one flat chamfered surface extends from the terminal end surface to the circular-shaped side surface; and engagement of the at least one flat chamfered surface of the locking pin with the at least one recess of the engagement plate blocks rotation of the turntable relative to the base.

15. A miter saw comprising:

a base;

a turntable configured to be rotatable relative to the base; and a lock mechanism configured to lock rotation of the turntable relative to the base, the lock mechanism including:
　a locking pin that is movable along an axial direction of the locking pin relative to the turntable and configured to lock the rotation of the turntable by engaging with the base,
　a manipulatable lever configured to be pivotable in an up-down direction to release engagement of the locking pin with the base, the up-down direction being perpendicular to the axial direction of the locking pin, and
　a disengagement-holding member configured to hold the locking pin in a disengaged state from the base, wherein:

the manipulatable lever is pivotable about a pivot point that is located above the locking pin in the up-down direction, the disengagement-holding member includes a latching part and is movable between a latching position and a releasing position, the latching part is configured such that, when the locking pin is held at a disengaged position by the manipulatable lever and the disengagement-holding member is moved to the latching position, the latching part latches the locking pin and thereby restricts movement of the locking pin such that the locking pin is held in the disengaged state, the disengagement-holding member includes a U-shaped suspended part that surrounds a portion of the manipulatable lever and the latching part is disposed on the suspended part.

16. The miter saw according to claim 15, wherein:

a support body is provided on the lower surface of the turntable and has a support hole that slidably holds the locking pin;

the manipulatable lever has a circumvention hole;

at least a portion of the support body and the disengagement-holding member extend through the circumvention hole at least when the manipulatable lever is pivoted upward; and the latching part is disposed on a vertically extending wall that extends upward from the suspended part through the circumvention hole and faces the support hole of the support body.

17. The miter saw according to claim 15, wherein:

the latching part of the disengagement-holding member has a latching hole that includes a large-hole portion and a small-hole portion;

the locking pin has a small-diameter portion, a large-diameter portion, and a tapered portion between the small-diameter portion and the large-diameter portion; and the latching part is configured such that, when the locking pin is held at the disengaged position and the disengagement-holding member is moved to the latching position, the tapered portion fits into the small-hole portion of the disengagement-holding member and holds the disengagement-holding member at the latching position such that the locking pin is also held in the disengaged state.

18. The miter saw according to claim 17, wherein:

the locking pin is biased toward a locked position with the turntable by a first spring;

the manipulatable lever is configured such that upward pivoting movement of the manipulatable lever causes the locking pin to move to the disengaged position against the bias of the first spring, and to move the small-diameter portion into the latching hole; and when the disengagement-holding member is disposed in the latching position, the first spring presses the tapered portion against the small-hole portion of the latching hole to hold the tapered portion in the small-hole portion.

19. The miter saw according to claim 18, wherein:

the disengagement-holding member is biased toward the releasing position by a second spring; and when the manipulatable lever is moved upward while the locking pin is held in the disengaged state from the base, the tapered portion is released from the small-hole portion, and the second spring causes the disengagement-holding member to return to the releasing position.

20. The miter saw according to claim 15, wherein:

the base comprises an engagement plate having at least one recess;

a tip portion of the locking pin includes a terminal end surface and a circular-columnar-shaped side surface adjacent thereto;

at least one flat chamfered surface extends from the terminal end surface to the circular-shaped side surface; and engagement of the at least one flat chamfered surface of the locking pin with the at least one recess of the engagement plate blocks rotation of the turntable relative to the base.

* * * * *